US011972712B2

(12) United States Patent
Ranjan et al.

(10) Patent No.: US 11,972,712 B2
(45) Date of Patent: Apr. 30, 2024

(54) INTELLIGENT ADJUSTMENT OF SCREEN REFRESH RATE

(71) Applicant: Micron Technology, Inc., Boise, ID (US)

(72) Inventors: Ashish Ranjan, Boise, ID (US); Carly M. Wantulok, Boise, ID (US); Prateek Trivedi, Boise, ID (US); Carla L. Christensen, Boise, ID (US); Jun Huang, Boise, ID (US); Avani F. Trivedi, Boise, ID (US)

( * ) Notice: Subject to any disclaimer, the term of this patent is extended or adjusted under 35 U.S.C. 154(b) by 0 days.

(21) Appl. No.: 17/691,678

(22) Filed: Mar. 10, 2022

(65) Prior Publication Data

US 2022/0270533 A1 Aug. 25, 2022

Related U.S. Application Data

(63) Continuation of application No. 16/917,529, filed on Jun. 30, 2020, now Pat. No. 11,276,340.

(60) Provisional application No. 62/955,916, filed on Dec. 31, 2019.

(51) Int. Cl.
*G09G 3/20* (2006.01)

(52) U.S. Cl.
CPC ........... *G09G 3/20* (2013.01); *G09G 2310/08* (2013.01); *G09G 2320/103* (2013.01); *G09G 2340/0435* (2013.01)

(58) Field of Classification Search
CPC ............... G09G 3/20; G09G 2330/021; G09G 2340/0435; G09G 2310/08; G09G 2320/103; G09G 2380/02; G09G 2354/00; G09G 2320/0247; G09G 2310/0281; G06F 3/14; G06F 1/3265; G06F 2221/2129; G06F 3/04883; G06T 1/20; G06T 11/60; G06T 15/005; G06T 2200/24; G06T 2207/10016; G06T 7/20; H04N 5/2628; H04N 2201/3222; H04N 23/62; H04N 23/00
See application file for complete search history.

(56) References Cited

U.S. PATENT DOCUMENTS

| | | | | |
|---|---|---|---|---|
| 9,977,673 | B1 | 5/2018 | Friedkin et al. | |
| 11,094,033 | B2 * | 8/2021 | Vembu | G06T 1/20 |
| 2014/0267360 | A1 | 9/2014 | Finkel | |
| 2016/0078838 | A1 * | 3/2016 | Huang | G09G 5/00 345/520 |

(Continued)

*Primary Examiner* — Xilin Guo
(74) *Attorney, Agent, or Firm* — Holland & Hart LLP

(57) ABSTRACT

Methods, systems, and devices that support a dynamic screen refresh rate are described. An electronic device may dynamically (e.g., autonomously, while operating) adjust the rate at which a screen is refreshed, such as to balance considerations such as user experience and power consumption by the electronic device. For example, the electronic device may use an increased refresh rate when executing applications for which user experience is enhanced by a higher refresh rate and may use a decreased refresh rate when executing other applications. As another example, the electronic device may use different refresh rates while executing different portions of the same application, as some aspects of an application (e.g., more intense portions of a video game) may benefit more than others from a higher refresh rate. The electronic device may also account of other factors, such as battery level, when setting or adjusting the refresh rate of the screen.

18 Claims, 10 Drawing Sheets

(56) References Cited

U.S. PATENT DOCUMENTS

| | | | | |
|---|---|---|---|---|
| 2018/0112986 | A1* | 4/2018 | Putnam .................. | G01C 19/36 |
| 2019/0180705 | A1* | 6/2019 | Choudha ............... | G06F 3/0485 |
| 2020/0402478 | A1 | 12/2020 | Her et al. | |
| 2022/0343820 | A1* | 10/2022 | Wen ..................... | G09G 3/2092 |

* cited by examiner

INTELLIGENT ADJUSTMENT OF SCREEN REFRESH RATE

CROSS REFERENCE

The present Application for patent is a continuation of U.S. patent application Ser. No. 16/917,529 by RANJAN et al., entitled "INTELLIGENT ADJUSTMENT OF SCREEN REFRESH RATE," filed Jun. 30, 2020, which claims the benefit of U.S. Provisional Patent Application No. 62/955,916 by RANJAN et al., entitled "INTELLIGENT ADJUSTMENT OF SCREEN REFRESH RATE," filed Dec. 31, 2019, each of which is assigned to the assignee hereof, and each of which is expressly incorporated by reference herein.

BACKGROUND

The following relates generally to electronic devices and more specifically to a dynamic screen refresh rate for an electronic device.

Screens are widely used by various electronic devices such as computers, wireless communication devices, mobile devices, cameras, televisions, and the like. Screens may be used to display content (e.g., information or graphics) related to an application being executed by the electronic device. The screen may update the displayed content according to a refresh rate. A refresh rate may refer to a quantity of times a screen is updated (e.g., a number of refresh cycles) per a second. For example, if a screen is updated sixty times in a second, the screen may have a 60 hertz (Hz) refresh rate.

DETAILED DESCRIPTION

Figure 1:
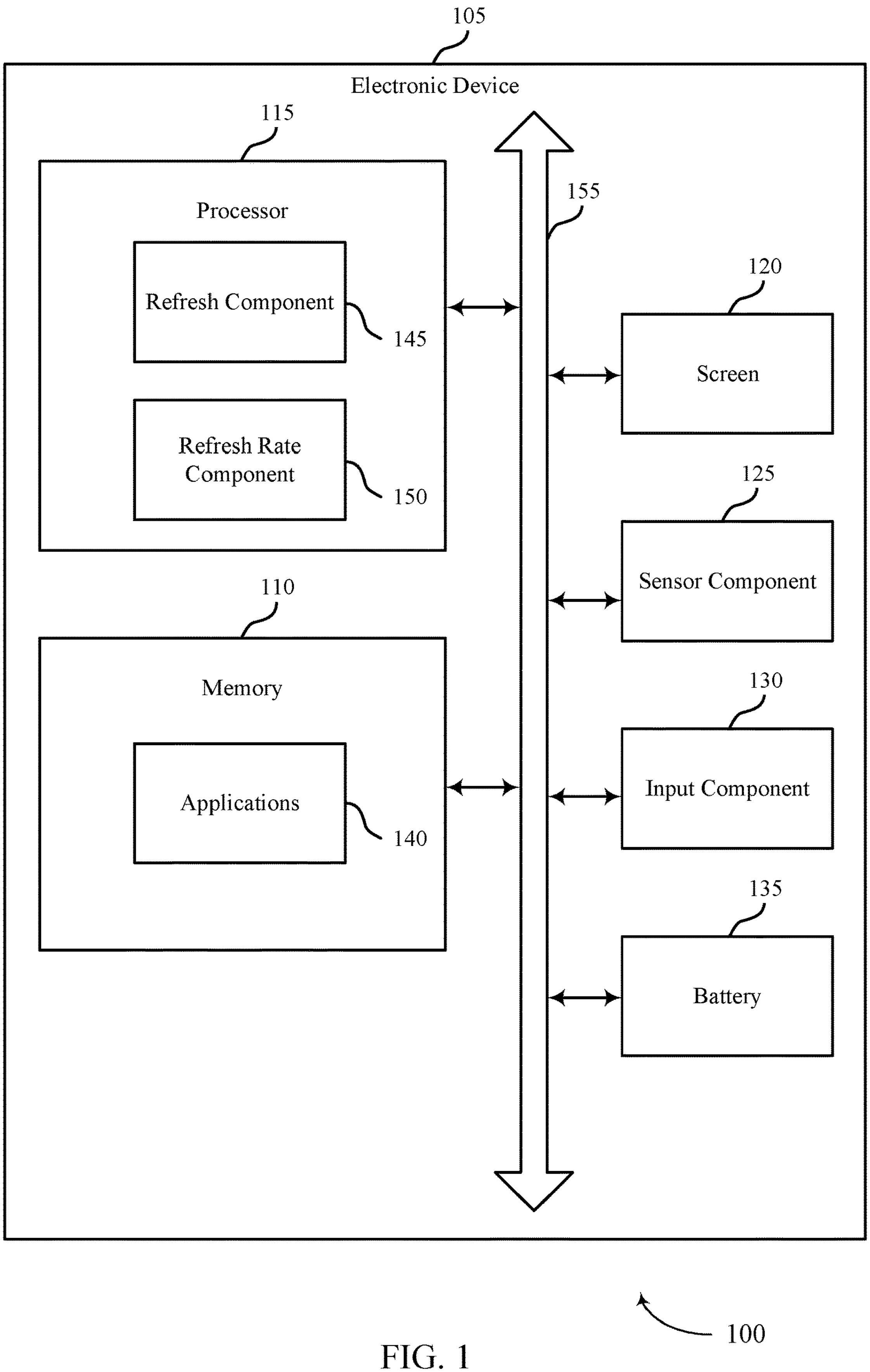
FIG. 1 illustrates an example of a block diagram of an electronic device that supports a dynamic screen refresh rate in accordance with examples as disclosed herein.

An electronic device may display images (which may refer generally to any displayed content) on a screen while executing one or more applications. The electronic device may refresh the screen to update the displayed image according to a periodicity or refresh rate. In some cases, a higher refresh rate (e.g., 90 hertz (Hz), 120 Hz, 240 Hz) may increase a user experience when compared to a lower refresh rate (e.g., 30 Hz, 60 Hz). For example, as video definition improves (e.g., as video streaming capabilities improve), data rates increase (e.g., for mobile devices), and as enhanced streaming and gaming applications become increasingly available for electronic devices, a lower refresh rate may inhibit—and thus a higher refresh rate may enhance—a user's experience.

As one example, advancements in cellular communications technology (e.g., 5G) may support cloud-based or other mobile gaming applications, virtual reality applications, or streaming (e.g., high definition video streaming) applications for which a screen refresh rate this is too low may inhibit a user's experience. An increase in screen refresh rate may, however, increase power consumption by the electronic device that includes the screen. For example, an electronic device that refreshes a screen at 90 Hz may consume more power than an electronic device that refreshes a screen at 30 Hz. In some cases (e.g., for a device with a limited battery such as a mobile device or laptop computer), increased power consumption may decrease battery life. Thus, a refresh rate that is optimal for user experience with some applications may not be optimal with respect to other performance considerations, such as battery life.

As described herein, an electronic device may support more than one refresh rate, as well as varying (e.g., increasing or decreasing) the refresh rate dynamically (e.g., autonomously, in real time, based on triggers or other criteria monitored and sensed by the electronic device). Thus, the electronic device may determine whether to utilize a lower refresh rate (e.g., to conserve power) or to utilize a higher refresh rate (e.g., to increase a user experience) while operating (e.g., while executing or preparing to execute one or more applications).

In some cases, the electronic device may select a screen refresh rate based on an application being executed or to soon be executed by the electronic device, and thus may vary the screen refresh rate in response to a change in application for which images are displayed, as different applications may benefit to a different degree from an increased refresh rate. For example, different refresh rates may be associated with different applications (e.g., through a lookup table or metadata associated with the applications. Thus, if the electronic device switches from executing a first application to executing a second application, the electronic device may switch from refreshing the screen according to a first refresh rate (e.g., associated with the first application) to refreshing the screen according to a second refresh rate (e.g., associated with the second application). As one such example, the electronic device may execute a gaming application according to a relatively higher refresh rate to enhance user experience, but if the electronic device switches to executing a different application (e.g., a texting application), the electronic device may dynamically decrease the refresh rate of a screen, as the decreased refresh rate may not inhibit a user experience for the different application and may provide power savings or other benefits. The electronic device may increase the refresh rate if the electronic device switches back to executing the gaming application.

Additionally or alternatively, the electronic device may dynamically adjust a refresh rate while executing and continuing to execute a single application. That is, the electronic device may increase or decrease the refresh rate depending on what aspects of an application are being executed. As one example, the electronic device may be executing a gaming application and may refresh the screen according to a higher refresh rate during periods of high activity gameplay and may refresh the screen according to a lower refresh wait during periods of relatively lower activity gameplay. Thus, the electronic device may use the dynamic refresh rate to autonomously balance user experience with other performance considerations (e.g., battery life) even without a change in executed application.

Features of the disclosure are further described below, including in the context of an exemplary electronic device as described with reference to FIG. 1 and exemplary timing diagrams as described with reference to FIGS. 2 and 3. These and other features of the disclosure are then further illustrated by and described with reference to the exemplary apparatus diagrams and flowcharts of FIGS. 4-9.

FIG. 1 illustrates an example of a block diagram 100 of an electronic device 105 that supports a dynamic screen refresh rate in accordance with examples as disclosed herein. The electronic device 105 may be any electronic device 105, such as a computer, a wireless communication device, a mobile device, a camera, a digital display, a television, or a control panel. The electronic device 105 may include a memory 110, a processor 115, a screen 120, a sensor component 125, an input component 130, and a battery 135. Each of these components may communicate, directly or indirectly, with one another (e.g., via one or more buses 155).

The electronic device 105 may include and be powered by a battery 160, which may include any number of separate batteries of any type. The electronic device 105 may include memory 110 to store data and code related to one or more applications 140 for execution by the processor 115. The electronic device 105 may further include a screen 120 to display graphics. For example, the processor 115 may execute one or more applications 140 and cause the screen 120 to display related content (e.g., images). The processor may include a refresh component 145, which may manage refreshes of the screen 120, and a refresh rate component 150, which may manage a refresh rate of the screen 120. In some examples, the functions associated with the refresh component 145 and the refresh rate component 150 may be implemented as instructions stored in the memory 110 and executed by the processor 115. Additionally or alternatively, the functions associated with the refresh component 145 and the refresh rate component 150 may be implemented by a combination of hardware (e.g., logic or special-purpose circuitry or any combination thereof) and/or software (e.g., firmware). The electronic device 105 may dynamically (e.g., autonomously) adjust a refresh rate of the screen 120.

In some cases, the electronic device 105 may include multiple screens 120. Additionally or alternatively, a display screen 120 may be a foldable screen. Where the electronic device includes multiple screens 120 or multiple independently controllable screen portions, the refresh rate component 150 may determine a refresh rate independently for each screen 120 (e.g., if the electronic device 105 includes multiple screens) or for each portion of the screen 120 (e.g., if the electronic device 105 includes a foldable display screen 120 with independently controllable portions). That is, each screen 120 or portion of the screen 120 may be displayed using a refresh rate that is independent of a refresh rate used for a different screen 120 or portion of the screen 120.

The electronic device 105 may further include an input component 130 which may be configured to receive one or more inputs (e.g., from a user) and communicate the inputs to the processor 115 by the bus 155. The electronic device 105 may also include a sensor component 125, which may include any number and type of sensors (e.g., a gyroscope, a pressure sensor, among other examples) and provide sensor data to the processor 115.

The memory 110 may provide physical memory addresses/space for the electronic device 105. For example, the memory 110 may store data or code related to the one or more applications 140. The memory 110 also may store data or code related to other operations performed by the electronic device 105. The memory 110 may receive access commands (e.g., read commands, write commands, refresh commands) from the processor 115. The memory 110 may execute the received access commands and, in some cases, transmit data to the processor 115 in response to the access commands. The memory 110 may include any number of separate memory devices or dies and may include any type of memory, including multiple types of memory. For example, the memory device 110 may include one or more of random access memory (RAM), read only memory (ROM), a dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory, or other type of memory.

The processor 115 may be configured to execute computer-readable instructions stored in the memory 110 to cause the electronic device 105 to perform various functions. For example, the processor 115 may execute computer-readable instructions stored in the memory 110 associated with one or more applications 140. The processor 115 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 115 may be configured to operate the memory 110 using a memory controller, where the memory controller may be coupled with or included in the processor 115.

In some cases, the processor 115 may execute applications 140 based on indications received from the input component 130. For example, the input component 130 may include or be coupled with any number and type of user input components (e.g., the screen 120 may be a touchscreen and may provide input data to input component 130, or the input component 130 may include or be coupled with a keypad, among other types of user input devices) or other components operable to receive information. For example, the processor 115 may determine that a user has selected an application 140 for execution at the electronic device 105 based on an indication from the input component 130 (e.g., by a touch screen input). Here, the processor 115 may select the application 140 for execution and communicate with the memory 110 to execute the application 140 at the electronic device 105. In another example, the input component 130 may receive data from another device. For example, the electronic device 105 may be a mobile phone and the input component 130 may receive wireless communications (e.g., from a base station). Based on the received data from another device, the processor 115 may determine to execute an application 140. For example, if the input component 130 receives a call (e.g., from a base station, from a mobile device), the processor 115 may determine to execute the application 140 associated with receiving a phone call.

Executing an application 140 at the electronic device 105 may include displaying graphics associated with the application 140 on the screen 120. For example, if the application 140 is social media application, the electronic device 105 may display a social media feed on the screen 120. In another example, if the application 140 is a gaming application, the screen 120 may display images related to the game. When the processor 115 is executing an application, the processor 115 may refresh the screen 120 to update the displayed image according to a refresh rate. For example, the refresh component 145 may be configured to refresh the screen 120 according to a configured refresh rate and the refresh rate component 150 may be configured to set (e.g., determine and adjust or otherwise configure) the refresh rate for the screen 120.

The refresh rate component 150 may identify a default refresh rate associated with each application 140 (e.g., a native refresh rate). For example, a default refresh rate for a text messaging application 140 may be 60 Hz. Additionally or alternatively, a default refresh rate for a gaming application 140 may be 120 Hz. When the processor 115 initiates an execution of an application 140, the refresh component 145 may refresh the screen 120 according to the default refresh rate. In some cases, default refresh rates may be stored in association with respective applications as part of a lookup table in memory 110. Additionally or alternatively, data or metadata included in an application 140 may identify (e.g., indicate) a default refresh rate for the application.

The refresh rate component 150 may also determine to adjust a refresh rate of the screen 120 (e.g., increase or decrease the refresh rate relative to the default refresh rate of an application 140 being executed) based on one or more factors. For example, the refresh rate component 150 may change the refresh rate of the screen 120 based on data associated with the application 140 being executed by the processor (e.g., which portion of a game is being played, which portion of a video is being streamed), a power level of the battery 135, and one or more other factors such as user inputs, data associated with other applications 140, or environmental factors. Thus, the refresh rate component 150 may enable the electronic device 105 to dynamically adjust a refresh rate of the screen 120 both across applications 140 and within applications 140.

In some cases, the refresh rate component 150 may determine to adjust or set the refresh rate of the screen 120 based on an intermediate or other metric determined based on a combination of any number (e.g., two or more) factors described herein. For example, the refresh rate component 150 may determine a refresh rate of the screen 120 based on a first factor (e.g., a likelihood of the user switching to a second application within some threshold amount of time, or likelihood of returning to the first application within some threshold amount of time after switching to the second application) in combination with a second factor (e.g., rate of user inputs, content generated by the application such as which stage of a game the user is playing, sensor data for the device 105 time of day, etc.). In some cases, the refresh rate component 150 may determine the metric by applying different weights or scaling factors (e.g., predetermined weights, dynamic weights) to different factors (e.g., the metric may comprise a weighted sum or weighted average of any number of factors for refresh rate determination or adjustment described herein), and the refresh rate component 150 may determine a refresh rate for the screen 120 based on comparing the metric to one of more thresholds (e.g., determining a range within the metric falls). In some instances, the refresh rate component 150 may utilize a machine-learned model (e.g., based on historic refresh rates and the data (factors) related to the determination thereof) to determine an appropriate refresh rate. The machine-learned model may be generated in view of any number of the factors for refresh rate determination or adjustment described herein.

Additionally or alternatively, the refresh component 145 may determine the refresh rate for the screen 120 based on a user-selected operating mode. For example, the user may select a power-saving mode which may be associated with a relatively low refresh rate of the screen 120 (e.g., 30 Hz, 60 Hz). In another example, the user may select a high-performance mode which may be associated with a relatively high refresh rate of the screen 120 (e.g., 90 Hz-240 Hz).

In some cases, the application 140 may communicate (e.g., based on an indication, which may be called a trigger, embedded within the application 140) to the refresh rate component 150 a desired refresh rate while executing the application 140. For example, a gaming application 140 may have a default refresh rate of 120 Hz. The application 140 also may communicate a trigger to the refresh rate component 150 indicating different refresh rates based on a game scenario or screen display. For example, the application 140 may indicate, to the refresh rate component 150, a lower refresh rate (e.g., 90 Hz, 60 Hz, 30 Hz) during portions of the game with relatively low action or user interaction. In another example, a social media application 140 may have a default refresh rate of 60 Hz. The application 140 may communicate a trigger, to the refresh rate component 150, indicating a higher refresh rate (e.g., 90 Hz, 120 Hz) when the screen 120 is configured to display a video associated with the application 140. In some other cases, the trigger may be based on a rate of data transfer over the bus 155. For example, as the data transfer rate over the bus 155 increases, the refresh rate component 150 may determine to increase the refresh rate of the screen 120.

Additionally or alternatively, the refresh rate component 150 may determine to adjust a refresh rate of the screen 120 from a default refresh rate based on receiving one or more indications from the sensor component 125 or the input component 130. For example, the sensor component 125 or the input component 130 may be operable to determine user inputs and related information (e.g., the pressure with which a user presses on the screen 120 or a button of the electronic device 105, the angle at which a user tilts the electronic device 105, a rate at which a user rotates the electronic device 105). The sensor component 125 or the input component 130 communicate such to the refresh rate component 150. Based on such data, the refresh rate component 150 may adjust the refresh rate of the screen 120. In one example, the sensor component 125 may include a gyroscope sensor. Here, the refresh rate component 150 may receive the gyroscope data from the sensor component 125 and determine if the angle of the electronic device 105 is changing quickly (e.g., at a rate higher than a threshold rate). For example, a rapid change in angle may correspond to a game scenario (e.g., if the processor is executing a gaming application) with a large amount of action. Thus, the refresh rate component 150 may increase a refresh rate of the screen 120 in an event that the angle of the electronic device 105 is changing rapidly, or the refresh rate component 150 may decrease the refresh rate if the angle is changing slowly (e.g., at a rate below a threshold).

In another example, the sensor component 125 may include a pressure sensor which may be coupled with the screen 120. The refresh rate component 150 may receive the pressure sensor data from the input component 130 and determine if a pressure being exerted on the screen 120 is greater than a threshold pressure. For example, increased pressure may correspond to a user interacting with the electronic device 105 during a high-action gaming scenario. Thus, the refresh rate component 150 may increase the refresh rate of the screen 120 if a large amount of pressure (e.g., a pressure greater than a threshold) is detected on the screen 120. Additionally or alternatively, the refresh rate component 150 may determine if a periodicity of pressure being exerted on the screen 120 is greater than a threshold periodicity. For example, an increased periodicity of pressure being exerted on the screen 120 (e.g., associated with a user rapidly pressing on the screen 120) may correspond to a high-action gaming scenario. As another example, the increased periodicity of pressure being exerted on the screen 120 may correspond to a fast scrolling scenario (e.g., quickly scrolling through a social media 'feed'). Thus, the refresh rate component 150 may increase a refresh rate of the screen 120 when a periodicity of pressure being exerted on the screen 120 increases (e.g., beyond a threshold), or decrease the refresh rate if the periodicity decreases. As another example, the input component 130 may collect image data from a camera of the electronic device. The refresh rate component 150 may adjust a refresh rate based on a facial expression of a user captured by the camera (e.g., certain facial expressions may be associated with more or less intense interaction with an application 140, such as more or less intense gameplay).

The refresh rate component 150 may adjust a refresh rate of the screen 120 while executing a first application 140 based on data associated with one or more other applications 140. For example, the refresh rate component 150 may receive data from or associated with a calendar application 140 and adjust a refresh rate of the screen 120 accordingly. That is, the refresh rate component 150 may determine that the electronic device 105 is not likely to be charged during a time period based on an event indicated by the calendar application 140. Thus, the refresh rate component 150 may decrease a refresh rate of the screen 120 to conserve power of the battery 135. As another example, the calendar application 140 may indicate that a user of the electronic device 105 has a flight scheduled. Thus, the refresh rate component 150 may determine to decrease a refresh rate of the screen 120 during a time period associated with the flight (e.g., during the flight, or with some window of the flight time) to preserve a power level of the battery 135. Additionally or alternatively, the refresh rate component 150 may receive data from a location application 140 (e.g., a global positioning system (GPS) application) and adjust the refresh rate of the screen 120 accordingly. For example, if a location of the electronic device 105 is associated with a charging station (e.g., a home of the user, a work of the user), the refresh rate component 150 may increase a refresh rate of the screen 120. Alternatively, if the location of the electronic device 105 fails to be associated with a charging station (e.g., a subway, a friend's house), the refresh rate component 150 may decrease a refresh rate of the screen 120 (e.g., to conserve power of the battery 135).

Additionally or alternatively, the refresh rate component 150 may determine to adjust the refresh rate of the screen 120 if the processor 115 switches from executing a first application 140 to a second application 140. For example, the refresh rate component 150 may determine to switch from a first default refresh rate associated with the first application 140 to a second default refresh rate associated with the second application 140. In some cases, a difference between the first and second default refresh rates may be relatively large. For example, the first application may have a default refresh rate of 30 Hz while the second application may have a default refresh rate of 120 Hz. Here, the refresh rate component 150 may increase the refresh rate of the screen 120 in increments. For example, the refresh component 145 may refresh the screen 120 according to 30 Hz, then 60 Hz, then 90 Hz, and final 120 Hz. In some cases, the refresh component 145 may refresh the screen 120 at an intermediate refresh rate for a period of time (e.g., in case there is a return to the first application within the period of time). Thus, if the processor switches from executing the first application 140 to the second application 140 for a short period of time prior to resuming an execution of the first application 140, the refresh component 145 may not refresh the screen 120 at the default refresh rate of the second application 140 but rather at the intermediate refresh rate and then again the default refresh rate of the first application 140.

In some cases, the refresh rate component 150 may determine to adjust the refresh rate of the screen 120 from the default refresh rate based on a power level of the battery 135. For example, the refresh rate component 150 may determine that a power level of the battery 135 is below a threshold. Here, the refresh rate component 150 may determine to prioritize a power consumption of the electronic device 105 to a user experience associated with using the electronic device 105. Thus, the refresh rate component 150 may decrease the refresh rate of the screen 120 from the default refresh rate of the application 140 to conserve a power level of the battery 135.

As one illustrative example, the electronic device 105 may be a mobile phone, and a user may be playing a high-end graphic game while a level of the battery 135 is at or near 100%. The processor 115 may determine that the user is playing the game with full intensity (e.g., above a threshold) based on one or more user inputs received by the input component 130 or sensor data detected by sensor component 125, and thus the refresh rate component 150 may configure the refresh rate for the screen 120 to be the highest supported refresh rate. For example, the processor 115 may determine that the user is playing the game with full intensity based on the user pushing the screen 120 frequently and thus providing a high rate of user inputs to input component 130, or with a high pressure as detected by sensor component 125. The user then may set the electronic device 105 down. For example, the user may receive a phone call, or there may be a knock on the user's door, which may cause the user to set down the electronic device 105. Subsequently, the refresh rate component 150 may determine to decrease a refresh rate of the screen 120 after one minute of no user interaction (e.g., while the electronic device 105 is set down), as the user inputs may cease. Thus, the refresh rate component 150 may dynamically adjust the refresh rate of the screen 120 down from the previous high refresh rate (e.g., to the lowest supported refresh rate), which may increase a battery life of the electronic device 105.

Figure 2:
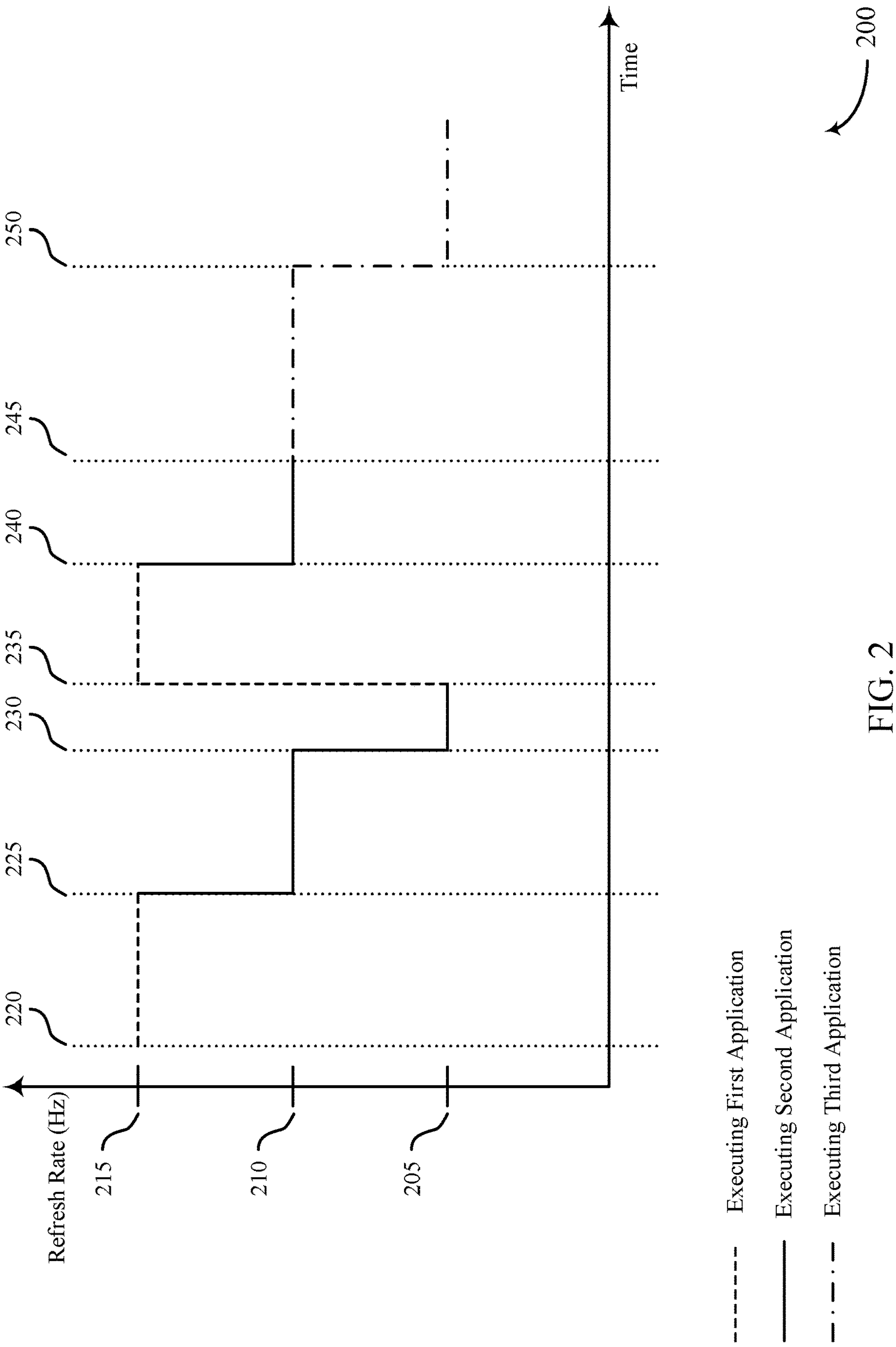
FIGS. 2 and 3 illustrate examples of timing diagrams for a dynamic screen refresh rate in accordance with examples as disclosed herein.

FIG. 2 illustrates an example of a timing diagram 200 for a dynamic screen refresh rate in accordance with examples as disclosed herein. For example, the timing diagram 200 may illustrate various screen refresh rates (e.g., 205, 210, and 215) that an electronic device utilizes with respect to time. The electronic device may include aspects of the electronic device as described with reference to FIG. 1. For example, the electronic device may include a refresh component that refreshes a screen of the electronic device according to a refresh rate and a refresh rate component that sets (e.g., adjusts) the refresh rate based on one or more factors. The timing diagram 200 may illustrate changes in refresh rates as the electronic device executes a first application, a second application, and a third application.

Refresh rate 205 may be a relatively low refresh rate, such as 30 Hz-60 Hz. Refresh rate 210 may be an intermediate refresh rate, such as 60 Hz-120 Hz. Refresh rate 215 may be a relatively high refresh rate such as 90 Hz-240 Hz. It is to be understood that these and any other numeric examples herein are solely for clarity of illustrating the concepts described herein and are not limiting. Table 1, shown below, indicates an example relationship between a type of application and a default refresh rate.

TABLE 1

| Default Refresh Rates for Applications | |
|---|---|
| Application Type | Default Refresh Rate (Hz) |
| High-end graphics | Fastest refresh rate |
| Mid-range graphs | Moderate refresh rate |
| Low speed graphics | Lowest refresh rate |

Any number of different refresh rates may be supported, and applications may be assigned corresponding default refresh rates in grouped or individual fashion, with assignments based on application type, associated metadata, user settings, or other criteria.

In the example of timing diagram 200, the first application may be a high-end graphics application (e.g., a high-end gaming application, a high definition video application, or another application for which a high refresh rate is advantageous) and may be associated with the fastest default refresh rate 215. The second application may be a low speed graphics application (e.g., a low speed gaming application, a text-based application, or another application for which a high refresh rate is not advantageous) and may be associated with a lowest default refresh rate 205. For example, the second application may be a text messaging application or a phone call application. The third application may be a mid-range graphics application (e.g., a mid-range gaming application or another application for which a high refresh rate is moderately advantageous) and may be associated with a moderate refresh rate 210. When the electronic device switches from executing one application to another application, a refresh rate component of the electronic device may determine which refresh rate (e.g., refresh rate 205, refresh rate 210, or refresh rate 215) to select based on one or more factors, including a default refresh rate of the application being executed.

At 220, the electronic device may be executing a first application according to the refresh rate 215. Refresh rate 215 may be a relatively high refresh rate (e.g., 120 Hz, 240 Hz). The first application may be a gaming application with a default refresh rate of refresh rate 215. A refresh rate component of the electronic device may determine to refresh the screen according to the default refresh rate 215 based on determining that a battery of the electronic device has a power level above a threshold value. Additionally, the refresh rate component may determine that an operating mode of the electronic device does not indicate a different refresh rate (e.g., a low-power operating mode associated with a lower refresh rate 205 or 210).

At 225, the electronic device may switch to executing a second application (e.g., in response to user input). The second application may be associated with the refresh rate 205 which may be a relatively low refresh rate (e.g., 30 Hz, 60 Hz). In some cases, the electronic device may adjust (e.g., automatically, autonomously, without additional or related user input) the refresh rate to an intermediate refresh rate 210 based on switching from executing the first application to executing the second application. That is, the refresh component may determine to switch to the intermediate refresh rate 210 rather than the default refresh rate 205. In some cases, incremental changes in refresh rates (e.g., refresh rate 215 to refresh rate 210, refresh rate 210 to refresh rate 205) may conserve more power when compared to larger changes in refresh rates (e.g., refresh rate 215 to refresh rate 205). Additionally or alternatively, the second application may be generally associated with a relatively short execution time (e.g., under five minutes). Here, the electronic device may refresh the screen according to the intermediate refresh rate 210 for a time period (e.g., five minutes) prior to adjusting the refresh rate to the default refresh rate 205. The time period may be predefined or predetermined. In some cases, if the electronic device switches to executing the first application during the time period (e.g., within five minutes), the electronic device may adjust the refresh rate back to refresh rate 215 from the intermediate refresh rate 210.

At 230, the electronic device may select the refresh rate 205 and begin refreshing the screen of the electronic device according to the refresh rate 205. In some cases, the electronic device may select the refresh rate 205 based on not detecting a switch from the second application to the first application within the time period (e.g., five minutes). For example, the time period may begin at 225 and end at 230. Thus, at 230 if the electronic device is still executing the second application, the electronic device may adjust the refresh rate to the refresh rate 205, which may be a default refresh rate of the second application.

At 235, the electronic device may switch to executing the first application. As discussed above, the first application may be a high-speed gaming application with a default refresh rate 215. Here, the refresh rate component may select the refresh rate 215 based on determining that a power level of the battery remains above the threshold power level. Additionally or alternatively, the refresh rate component may select the refresh rate 215 (e.g., as opposed to an intermediate refresh rate 210) based on an operating mode of the electronic device. For example, a user may have manually selected a high-definition mode associated with higher refresh rates (e.g., when associated with by an application being executed).

At 240, the electronic device may begin executing the second application. The electronic device may adjust the refresh rate to an intermediate refresh rate 210 based on switching from executing the first application to executing the second application. That is, the refresh component may determine to switch to the intermediate refresh rate 210 rather than the default refresh rate 205. Here, the electronic device may refresh the screen according to the intermediate refresh rate 210 for a time period (e.g., five minutes) prior to adjusting the refresh rate to the default refresh rate 205. In some cases, the time period may be proportional to a predicted amount of time that a user spends using the application (e.g., based on monitoring historical amounts of time the user spends using the application). That is, the time period may increase if the predicted amount of time increases and the time period may decrease if the predicted amount of time decreases. In some cases, such as if the second application is a gaming application, the time period may be different based on a time of day. For example, during a morning time or an evening time, the time period may be greater than during an afternoon time. In another example, the time period may be adjusted based on user input. For example, if the user inputs (e.g., detected by a pressure sensor) are rapid or associated with a high pressure, the time period may be greater than if the user inputs are less rapid or associated with less pressure. Additionally or alternatively, a state of the application may impact the time period. For example, if the application is associated with an end stage of a game, the time period may be greater than if the application is associated with an early or middle stage of a game.

At 245, the electronic device may begin executing the third application. In some cases, an amount of time between 240 and 245 may be less than the time period for use of the intermediate refresh rate 210. Therefore, the electronic device may not refresh the screen according to the default refresh rate (e.g., refresh rate 205) of the second application in between 240 and 245. Instead, at 245, the electronic device may continue to refresh the screen at refresh rate 210.

In some cases, the electronic device may continue to refresh the screen at refresh rate 210 because the default refresh rate for the third application may be refresh rate 210 (e.g., the electronic device may not change refresh rate at every switch between applications, as two applications may have the same default refresh rate, or an application may otherwise have the same default refresh rate as that being used at the time of the switch).

In some cases, when switching to a new application, or while executing an application, the electronic device may select to refresh the screen according to a refresh rate that is different that the default rate of the target (switched-to) application based on one or more factors. For example, at 250, the electronic device may begin refreshing the screen at refresh rate 205 while continuing to execute the third application. In a first example, a power of the battery may be detected at 250 as being below a threshold power level. Thus, the refresh rate component may use a refresh rate that is lower than the default rate to conserve power. Additionally or alternatively, the refresh rate component may receive data from a different application (e.g., a calendar application, a location application, or a settings application). In one example, the refresh rate component may determine that the user has a schedule indicating an extended amount of time without access to power (e.g., due to a flight, due to work, due to other scheduled events). Thus, the electronic device may decrease the refresh rate to refresh rate 205 to conserve power. In another example, the refresh rate component may determine that the user is at a location not associated with a power source (e.g., a subway, work) and may decrease the refresh rate to refresh rate 205 to conserve power.

In another example, the third application may indicate the slower refresh rate 205 to the refresh rate component. For example, the third application may include a trigger indicating to adjust the refresh rate 210 to the refresh rate 205. In some cases, this may be correlated with a portion of the gaming application associated with a decrease in activity. Thus, a decrease in refresh rate to refresh rate 205 may not result in a similar decrease in user experience.

Figure 3:
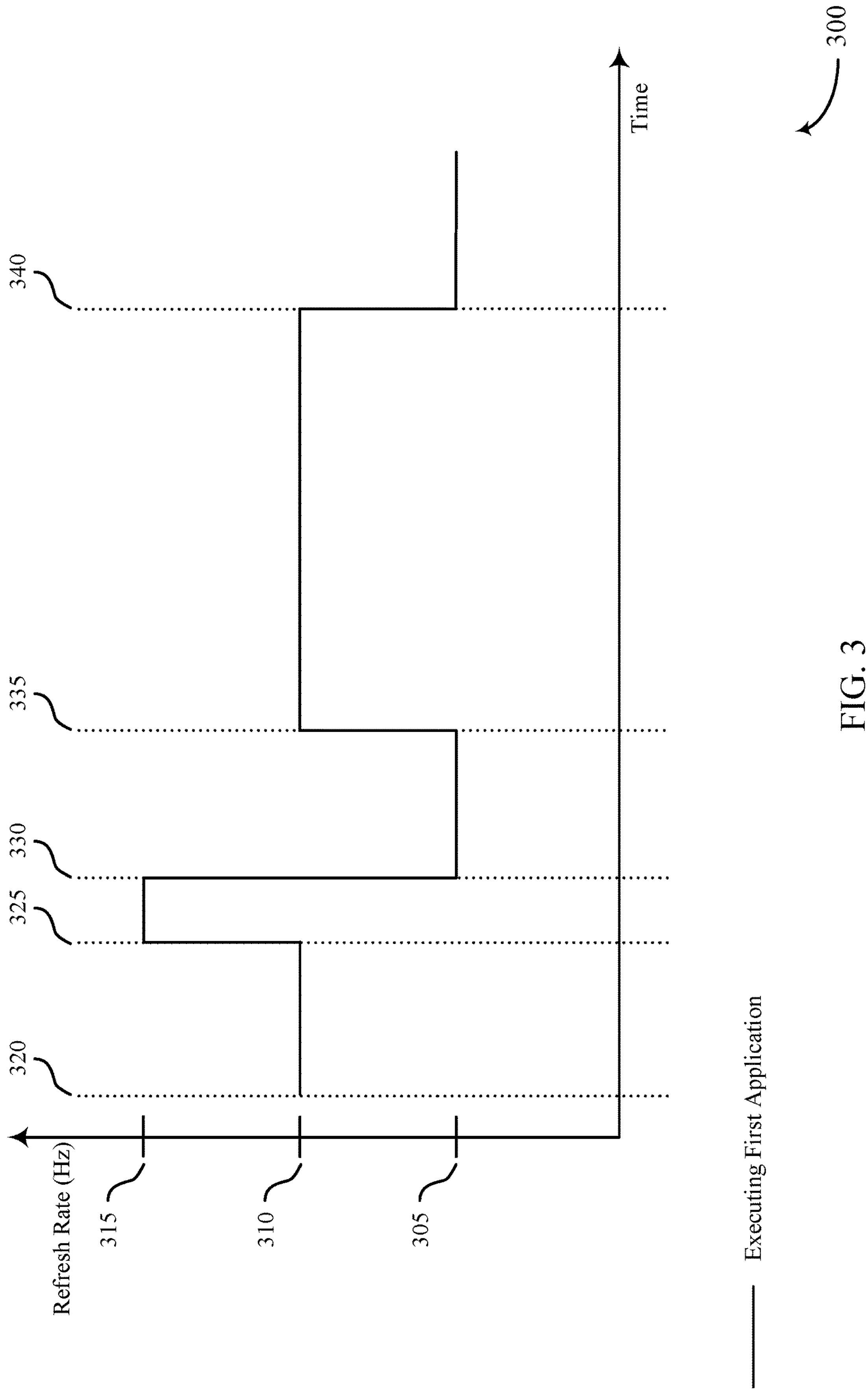

FIG. 3 illustrates an example of a timing diagram 300 for a dynamic screen refresh rate in accordance with examples as disclosed herein. For example, the timing diagram 300 may illustrate various screen refresh rates (e.g., 305, 310, and 315) that an electronic device utilizes with respect to time. The electronic device may include aspects of the electronic device as described with reference to FIGS. 1 and 2. For example, the electronic device may include a refresh component that refreshes a screen of the electronic device according to a refresh rate and a refresh rate component that determines to adjust the refresh rate based on one or more factors. The timing diagram 300 may illustrate changes in refresh rates as the electronic device executes a single first application.

Refresh rate 305 may be a relatively low refresh rate, such as 30 Hz-60 Hz. Refresh rate 310 may be an intermediate refresh rate, such as 60 Hz-120 Hz. Refresh rate 315 may be a relatively high refresh rate such as 90 Hz-240 Hz. In the example of timing diagram 300, the first application may be associated with a default of refresh rate 310. The refresh rate component may determine to adjust the refresh rate of the screen at various times based on one or more factors.

At 320, the electronic device may be executing the first application according to the default refresh rate 310. The refresh rate component of the electronic device may determine to refresh the screen according to the default refresh rate 310 based on determining that a battery of the electronic device has a power level above a threshold value. Additionally, the refresh rate component may determine that an operating mode of the electronic device does not indicate a different refresh rate (e.g., a low-power operating mode associated with a lower refresh rate 305 or a high-definition operating mode associated with a higher refresh rate 315).

At 325, the electronic device may select the refresh rate 315 and adjust the refresh rate from refresh rate 310 to refresh rate 315. In one example, the refresh rate component may adjust the refresh rate to refresh rate 315 based on one or more inputs (e.g., received from a user, received from a sensor). That is, an input component of electronic device may receive sensor data associated with a user input. For example, the refresh rate component may increase the refresh rate of the screen based on an amount of pressure on the screen being greater than a threshold amount of pressure on the screen. Additionally or alternatively, the refresh rate component may increase the refresh rate of the screen based on a periodicity of pressure on the screen being greater than a threshold periodicity. In another example, the refresh rate component may increase the refresh rate of the screen based on data from a sensor such as a gyroscope. That is, the angle of the electronic device may exceed a threshold angle resulting in the increased refresh rate. In some other cases, the refresh rate component may increase the refresh rate of the screen based on a detected rate of data over a bus of the electronic device exceeding a threshold.

At 330, the electronic device may select the refresh rate 305 and adjust the refresh rate from refresh rate 315 to refresh rate 305. In some cases, the refresh rate component may adjust the refresh rate to refresh rate 305 based on an indication from the application. For example, the application may indicate (e.g., by a trigger) to the refresh component to adjust the refresh rate to refresh rate 305. In some cases, the indication may indicate that a user experience may not be impacted (or in some cases, may be minimally impacted) by the lower refresh rate 305 during a time period from 330 to 335. In some other cases, the refresh rate component may adjust the refresh rate to refresh rate 305 based on data received from another application (e.g., a calendar application, a location application). For example, the refresh rate component may determine that the electronic device is not likely to be charged during a time period from 330 to 335 based on an event indicated by the calendar application. Thus, the refresh rate component may decrease a refresh rate of the screen to refresh rate 305 to conserve power of the battery. In another example, the refresh rate component may receive data from a location application (e.g., a GPS application) and determine that a location of the electronic device is not associated with a charging station (e.g., a subway, a friend's house). Thus, the refresh rate component may decrease a refresh rate of the screen to refresh rate 305 to conserve power.

At 335, the electronic device may select the refresh rate 315 and adjust the refresh rate from refresh rate 305 to refresh rate 310. The refresh rate component may adjust the refresh rate 305 to refresh rate 310 based on a user-selected operating mode. For example, the user may have selected a high-definition mode associated with the higher refresh rate 310.

At 340, the electronic device may select the refresh rate 305 and adjust the refresh rate from refresh rate 310 to refresh rate 305. In some cases, the refresh rate 305 may be less than a default refresh rate 310 associated with the first application. The refresh rate component may determine to adjust the refresh rate based on one or more factors. In a first example, a power of the battery may drop below a threshold power level. Thus, the refresh rate component may decrease the refresh rate from refresh rate 310 to refresh rate 305 to conserve power. Additionally or alternatively, the refresh rate component may receive data from a different application (e.g., a calendar application, a location application). In one example, the refresh rate component may determine that the user has a schedule indicating an extended amount of time without access to power (e.g., due to a flight, due to work, due to other scheduled events). Thus, the electronic device may decrease the refresh rate to refresh rate 305 to conserve power. In another example, the refresh rate component may determine that the user is at a location not associated with a power source (e.g., a subway, work) and may decrease the refresh rate to refresh rate 305 to conserve power.

In another example, the refresh rate component may determine to operate at the lower refresh rate 305 based on a user-selected operating mode (e.g., a power-conservation mode).

It is to be understood that any type of basis described herein for setting or adjusting a screen refresh rate may be a basis for either increasing or decreasing the refresh rate (e.g., a trigger embedded in an application may be configured to cause an increase in refresh rate or to cause a decrease in refresh rate), either when switching between applications or while executing a same application, depending on implementation.

Figure 4:
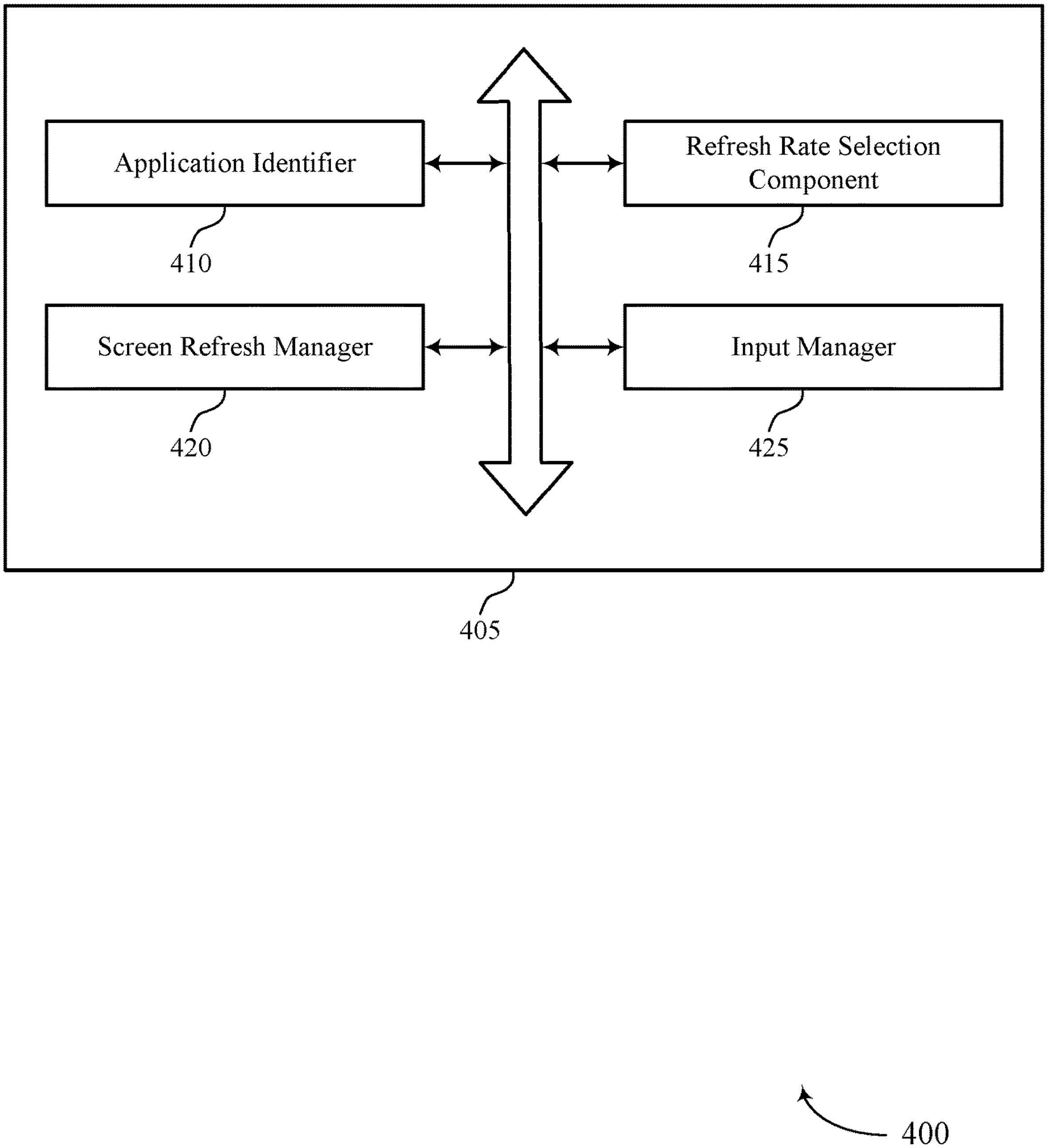
FIG. 4 shows a block diagram of an electronic device that supports a dynamic screen refresh rate in accordance with aspects of the present disclosure.

FIG. 4 shows a block diagram 400 of an electronic device 405 that supports a dynamic screen refresh rate in accordance with examples as disclosed herein. The electronic device 405 may be an example of aspects of an electronic device as described with reference to FIGS. 1 through 3. The electronic device 405 may include an application identifier 410, a refresh rate selection component 415, a screen refresh manager 420, and an input manager 425. Each of these modules may communicate, directly or indirectly, with one another (e.g., via one or more buses). In some examples, the device 405 may be a mobile device (e.g. a smartphone).

In some examples, the application identifier 410 may identify an application for execution at the device 405. For example, the application identifier 410 may monitor what application is associated with a thread currently being executed by a processor of the device 405. The refresh rate selection component 415 may select a refresh rate for a screen of the device 405 based on identifying the application, the refresh rate selected from one of a set of refresh rates supported by the device 405 for the screen. The screen refresh manager 420 may refresh the screen according to the refresh rate concurrent with executing the application.

In some examples, the application identifier 410 may identify, while the screen refresh manager 420 is refreshing the screen according to the refresh rate, a second application for execution at the device 405. The refresh rate selection component 415 may select a second refresh rate for the screen based on identifying the second application. The screen refresh manager 420 may refresh the screen according to the second refresh rate while the device 405 is executing the second application. In some examples, the screen refresh manager 420 may refresh the screen according to a third refresh rate concurrent with the second application being executed at the device 405 and before refreshing the screen according to the second refresh rate, where the third refresh rate is between the refresh rate and the second refresh rate.

In some examples, the application identifier 410 may monitor for a switch from the second application to the first application while the screen refresh manager 420 is refreshing the screen according to the third refresh rate, where refreshing the screen according to a second refresh rate is based on not detecting any switch to the first application for at least a threshold amount of time.

In some examples, the application may be executed at the device 405 for a duration, and the screen may be refreshed according to the refresh rate for a first portion of the duration. Here, the screen refresh manager 420 may refresh the screen according to a different refresh rate for a second portion of the duration.

In some examples, the input manager 425 may identify, based on source code for the application, an indication to adjust the refresh rate for the screen. The refresh rate selection component 415 may adjust, concurrent with execution of the application at the device 405, the refresh rate for the screen based on the indication.

In some examples, the input manager 425 may identify, concurrent with execution of the application on the device 405, an amount of pressure on the screen. The refresh rate selection component 415 may adjust the refresh rate for the screen based on the amount of pressure on the screen.

In some examples, the input manager 425 may identify, concurrent with execution of the application on the device 405, a rate of user inputs associated with the application. The refresh rate selection component 415 may adjust the refresh rate for the screen based on the rate of user inputs.

In some examples, the input manager 425 may identify, concurrent with execution of the application on the device 405, sensor data for the device 405. In some examples, the refresh rate selection component 415 may adjust the refresh rate for the screen based on the sensor data.

In some examples, the input manager 425 may identify, concurrent with execution of the application on the device 405, a rate of data transfer over a bus within the device 405. The refresh rate selection component 415 may adjust the refresh rate for the screen based on the rate of data transfer.

In some examples, the input manager 425 may identify a state of a battery for the device 405, where selecting the refresh rate is based on the state of the battery. For example, the refresh rate selection component 415 may identify a default refresh rate associated with the application, and the refresh rate selection component 415 may determine an adjustment to the default refresh rate based on the state of the battery, where the refresh rate is based on the default refresh rate and the adjustment. In some examples, the input manager 425 may determine that the state of the battery corresponds to an amount of charge that is below a threshold amount, where the refresh rate is selected as the lowest of the set of refresh rates supported by the device 405 based on the amount of charge being below the threshold amount.

In some examples, the input manager 425 may evaluate data associated with another application hosted by the device 405, where the refresh rate is selected as the lowest of the set of refresh rates supported by the device 405 based on the data. The data may include usage data, calendar data, travel data, or any combination thereof.

In some examples, the screen refresh manager 420 may refresh a screen of the device 405 according to a first refresh rate while executing a first application at the device 405. In some examples, the application identifier 410 may detect, while the device 405 is executing a first application, a switch to a second application. In some examples, the refresh rate selection component 415 may identify, based on detecting the switch (e.g., from executing the first application to executing the second application), a second refresh rate associated with the second application. For example, the screen refresh manager 420 may refresh the screen according to the second refresh rate concurrent with executing the second application.

In some examples, the input manager 425 may identify an amount of charge for a battery of the device 405, where refreshing the screen according to the second refresh rate is based on the amount of charge satisfying a threshold.

In some examples, the input manager 425 may identify a trigger for a third refresh rate while executing the second application. The screen refresh manager 420 may refresh the screen according the third refresh rate while continuing to execute the second application. In some examples, the trigger includes an indication included in the application, a rate of commands received by the device 405, sensor data associated with the device 405, or a data transfer rate associated with the device 405.

In some examples, the application identifier 410 may detect a switch from a first application being executed at the device 405 to a second application. The refresh rate selection component 415 may adjust, based on detecting the switch, a refresh rate for a screen of the device 405 from a first refresh rate associated with the first application to a second refresh rate. The refresh rate selection component 415 may monitor for a condition while the screen is refreshed according to the second refresh rate. For example, the refresh rate selection component 415 may monitor for the condition periodically (e.g., at periodic intervals) during a monitoring period (e.g., predetermined amount of time). Additionally or alternatively, the refresh rate selection component 415 may monitor for the condition in response to a predetermined trigger condition (event). In some examples, the refresh rate selection component 415 may adjust the refresh rate for the screen based on whether the condition is satisfied (e.g., in response to determining that the condition is satisfied).

In some examples, the refresh rate selection component 415 may adjust the refresh rate for the screen from the second refresh rate to a third refresh rate based on the condition being satisfied. In some examples, the second refresh rate may be between the first refresh rate and the third refresh rate. In some examples, the third refresh rate may be associated with the second application.

In some examples, the refresh rate selection component 415 may adjust the refresh rate for the screen from the second refresh rate to (e.g., back to) the first refresh rate based on the condition being unsatisfied. For example, the refresh rate selection component 415 may adjust the refresh rate for the screen from the second refresh rate to the first refresh rate in response to determining that the condition is not satisfied.

In some examples, the refresh rate selection component 415 may cease monitoring for the condition based on a duration of the monitoring reaching a threshold amount of time.

In some examples, the condition includes the second application being executed at the device 405 for at least a threshold amount of time after the switch. In some examples, the condition includes the second application being continuously executed at the device 405 for at least a threshold amount of time after the switch. In some examples, the condition includes the screen being refreshed according to the second refresh rate for at least a threshold amount of time after the switch.

In some examples, the refresh rate selection component 415 may determine the second refresh rate based on the first refresh rate and a third refresh rate associated with the second application. In some examples, the refresh rate selection component 415 may identify the third refresh rate based on an evaluation of the source code for the second application.

In some examples, the refresh rate selection component 415 may access a lookup table based on detecting the switch. The refresh rate selection component 415 or another component of the device 405 may store the lookup table. In some examples, the refresh rate selection component 415 may identify the third refresh rate based on an entry in the lookup table for the second application.

In some examples, the refresh rate selection component 415 may determine a likelihood of a second switch from the second application to the first application, where the condition includes the likelihood being below a threshold for a duration of the monitoring. In some examples, the refresh rate selection component 415 may determine the likelihood of the second switch based on a rate of user inputs to the device 405, rate of data transfer over a bus within the device 405, a portion of the first application being executed prior to the switch from the first application to the second application, data associated with another application hosted by the device 405, or any combination thereof.

FIG. 4 shows a flowchart illustrating a method or methods 400 that supports a dynamic screen refresh rate in accordance with aspects of the present disclosure. The operations of method 400 may be implemented by an electronic device or its components as described herein. For example, the operations of method 400 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 405, the electronic device may identify an application for execution at the device. The operations of 405 may be performed according to the methods described herein. In some examples, aspects of the operations of 405 may be performed by an application identifier as described with reference to FIG. 4.

At 410, the electronic device may select a refresh rate for a screen of the device based on identifying the application, the refresh rate selected from one of a set of refresh rates supported by the device for the screen. The operations of 410 may be performed according to the methods described herein. In some examples, aspects of the operations of 410 may be performed by a refresh rate selection component as described with reference to FIG. 4.

At 415, the electronic device may refresh the screen according to the refresh rate concurrent with executing the application. The operations of 415 may be performed according to the methods described herein. In some examples, aspects of the operations of 415 may be performed by a screen refresh manager as described with reference to FIG. 4.

In some examples, an apparatus as described herein may perform a method or methods, such as the method 400. The apparatus may include features, means, or instructions (e.g., a non-transitory computer-readable medium storing code including instructions executable by a processor of an electronic device) for identifying an application for execution at the device, selecting a refresh rate for a screen of the device based on identifying the application, the refresh rate selected from one of a set of refresh rates supported by the device for the screen, and refreshing the screen according to the refresh rate concurrent with executing the application.

Some examples of the method 400 and the apparatus described herein may further include operations, features, means, or instructions for identifying, while refreshing the screen according to the refresh rate, a second application for execution at the device, selecting a second refresh rate for the screen based on identifying the second application, and refreshing the screen according to the second refresh rate concurrent with executing the second application.

Some cases of the method 400 and the apparatus described herein may further include operations, features, means, or instructions for refreshing the screen according to a third refresh rate concurrent with executing the second application at the device and before refreshing the screen according to the second refresh rate, where the third refresh rate may be between the refresh rate and the second refresh rate.

Some instances of the method 400 and the apparatus described herein may further include operations, features, means, or instructions for monitoring for a switch from the second application to the first application while refreshing the screen according to the third refresh rate, where refreshing the screen according to the second refresh rate may be based on not detecting any switch to the first application for at least a threshold amount of time.

In some examples of the method 400 and the apparatus described herein, the application may be executed at the device for a duration and the screen may be refreshed according to the refresh rate for a first portion of the duration. Here, the method 400 and the apparatus described herein may further include operations, features, means, or instructions for refreshing the screen according to a different refresh rate for a second portion of the duration.

Some cases of the method 400 and the apparatus described herein may further include operations, features, means, or instructions for identifying, based on source code for the application, an indication to adjust the refresh rate for the screen, and adjusting, concurrent with execution of the application at the device, the refresh rate for the screen based on the indication.

Some instances of the method 400 and the apparatus described herein may further include operations, features, means, or instructions for identifying, concurrent with execution of the application on the device, an amount of pressure on the screen, and adjusting the refresh rate for the screen based on the amount of pressure on the screen.

Some examples of the method 400 and the apparatus described herein may further include operations, features, means, or instructions for identifying, concurrent with execution of the application on the device, a rate of user inputs associated with the application, and adjusting the refresh rate for the screen based on the rate of user inputs.

Some cases of the method 400 and the apparatus described herein may further include operations, features, means, or instructions for identifying, concurrent with execution of the application on the device, sensor data for the device, and adjusting the refresh rate for the screen based on the sensor data.

Some instances of the method 400 and the apparatus described herein may further include operations, features, means, or instructions for identifying, concurrent with execution of the application on the device, a rate of data transfer over a bus within the device, and adjusting the refresh rate for the screen based on the rate of data transfer.

Some examples of the method 400 and the apparatus described herein may further include operations, features, means, or instructions for identifying a state of a battery for the device, where selecting the refresh rate may be based on the state of the battery.

Some cases of the method 400 and the apparatus described herein may further include operations, features, means, or instructions for identifying a default refresh rate associated with the application, and determining an adjustment to the default refresh rate based on the state of the battery, where the refresh rate may be based on the default refresh rate and the adjustment.

Some instances of the method 400 and the apparatus described herein may further include operations, features, means, or instructions for determining that the state of the battery corresponds to an amount of charge that may be below a threshold amount, where the refresh rate may be selected as the lowest of the set of refresh rates supported by the device based on the amount of charge being below the threshold amount.

Some examples of the method 400 and the apparatus described herein may further include operations, features, means, or instructions for evaluating data associated with another application hosted by the device, where the refresh rate may be selected as the lowest of the set of refresh rates supported by the device based on the data.

In some cases of the method 400 and the apparatus described herein, the data includes usage data, calendar data, travel data, or any combination thereof.

In some instances of the method 400 and the apparatus described herein, the device includes a mobile device.

Figure 5:
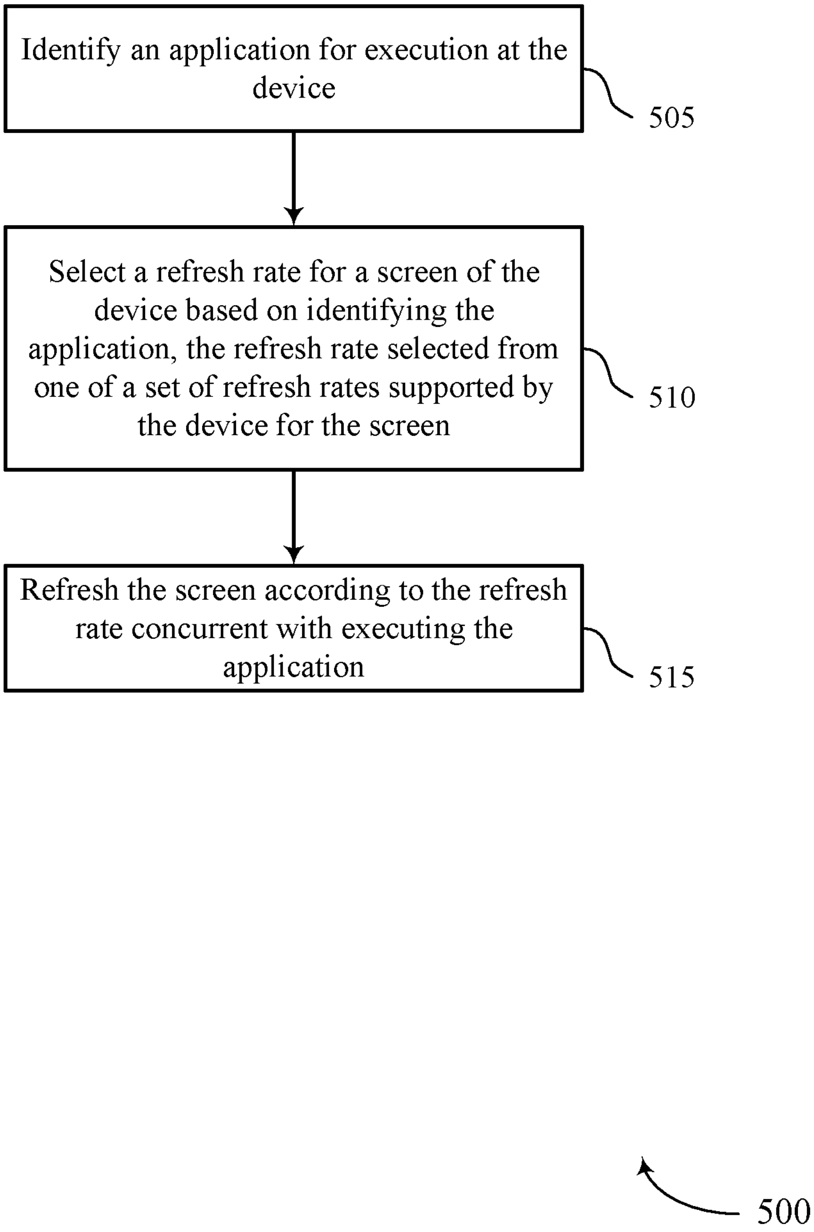
FIGS. 5 through 10 show flowcharts illustrating a method or methods that support a dynamic screen refresh rate in accordance with examples as disclosed herein.

FIG. 5 shows a flowchart illustrating a method or methods 500 that supports a dynamic screen refresh rate in accordance with aspects of the present disclosure. The operations of method 500 may be implemented by an electronic device or its components as described herein. For example, the operations of method 500 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 505, the electronic device may identify an application for execution at the device. The operations of 505 may be performed according to the methods described herein. In some examples, aspects of the operations of 505 may be performed by an application identifier as described with reference to FIG. 4.

At 510, the electronic device may select a refresh rate for a screen of the device based on identifying the application, the refresh rate selected from one of a set of refresh rates supported by the device for the screen. The operations of 510 may be performed according to the methods described herein. In some examples, aspects of the operations of 510 may be performed by a refresh rate selection component as described with reference to FIG. 4.

At 515, the electronic device may refresh the screen according to the refresh rate concurrent with executing the application. The operations of 515 may be performed according to the methods described herein. In some examples, aspects of the operations of 515 may be performed by a screen refresh manager as described with reference to FIG. 4.

At 520, the electronic device may identify, while refreshing the screen according to the refresh rate, a second application for execution at the device. The operations of

520 may be performed according to the methods described herein. In some examples, aspects of the operations of 520 may be performed by an application identifier as described with reference to FIG. 4.

At 525, the electronic device may select a second refresh rate for the screen based on identifying the second application. The operations of 525 may be performed according to the methods described herein. In some examples, aspects of the operations of 525 may be performed by a refresh rate selection component as described with reference to FIG. 4.

At 530, the electronic device may refresh the screen according to the second refresh rate concurrent with executing the second application. The operations of 530 may be performed according to the methods described herein. In some examples, aspects of the operations of 530 may be performed by a screen refresh manager as described with reference to FIG. 4.

Figure 6:
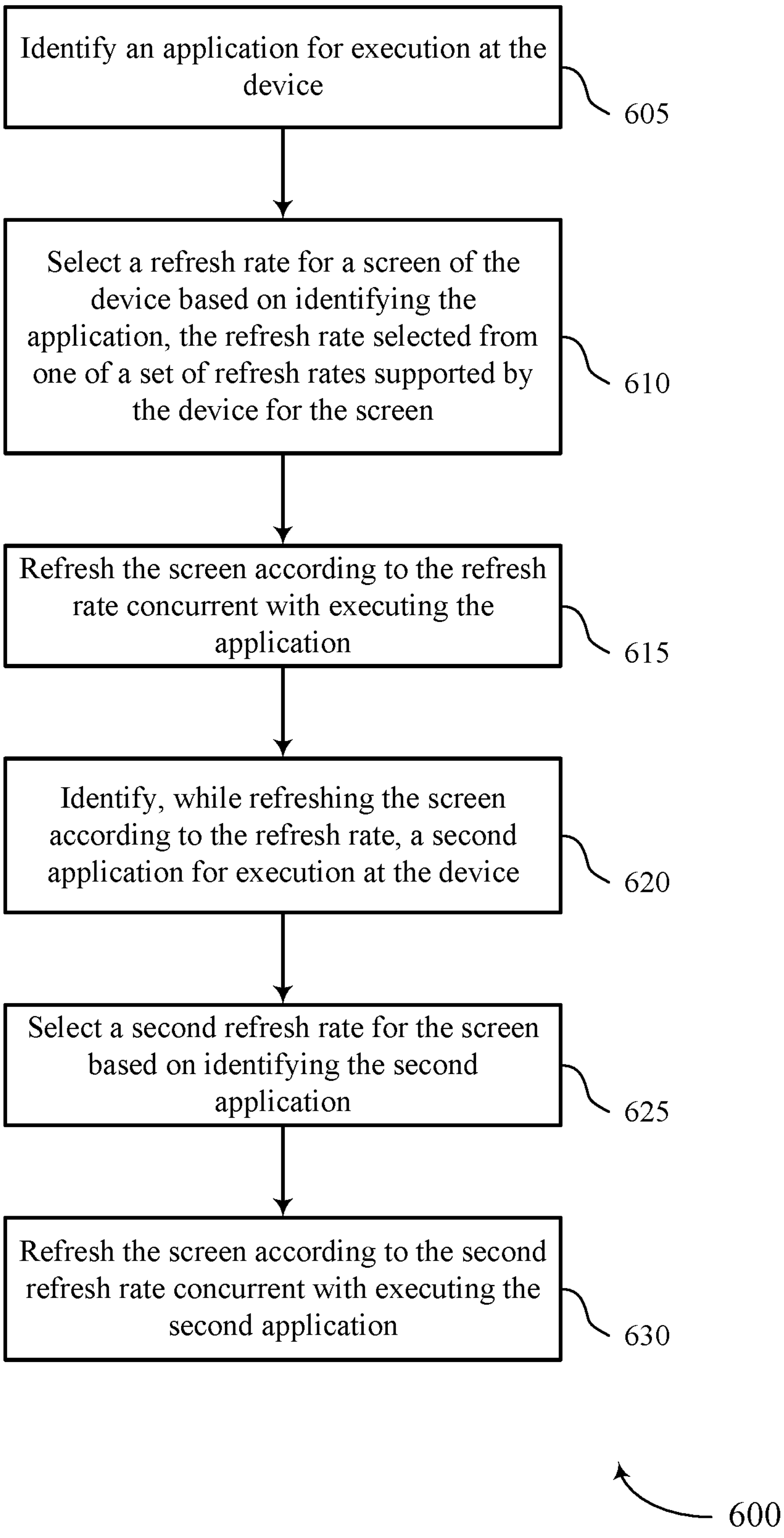

FIG. 6 shows a flowchart illustrating a method or methods 600 that supports a dynamic screen refresh rate in accordance with aspects of the present disclosure. The operations of method 600 may be implemented by an electronic device or its components as described herein. For example, the operations of method 600 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 605, the electronic device may identify an application for execution at the device. The operations of 605 may be performed according to the methods described herein. In some examples, aspects of the operations of 605 may be performed by an application identifier as described with reference to FIG. 4.

At 610, the electronic device may select a refresh rate for a screen of the device based on identifying the application, the refresh rate selected from one of a set of refresh rates supported by the device for the screen. The operations of 610 may be performed according to the methods described herein. In some examples, aspects of the operations of 610 may be performed by a refresh rate selection component as described with reference to FIG. 4.

At 615, the electronic device may refresh the screen according to the refresh rate concurrent with executing the application. The operations of 615 may be performed according to the methods described herein. In some examples, aspects of the operations of 615 may be performed by a screen refresh manager as described with reference to FIG. 4.

At 620, the electronic device may identify, while refreshing the screen according to the refresh rate, a second application for execution at the device. The operations of 620 may be performed according to the methods described herein. In some examples, aspects of the operations of 620 may be performed by an application identifier as described with reference to FIG. 4.

At 625, the electronic device may select a second refresh rate for the screen based on identifying the second application. The operations of 625 may be performed according to the methods described herein. In some examples, aspects of the operations of 625 may be performed by a refresh rate selection component as described with reference to FIG. 4.

At 630, the electronic device may monitor for a switch from the second application to the first application while refreshing the screen according to the third refresh rate that is between the refresh rate and the second refresh rate. The operations of 630 may be performed according to the methods described herein. In some examples, aspects of the operations of 630 may be performed by a refresh rate selection component as described with reference to FIG. 4.

At 635, the electronic device may refresh the screen according to the second refresh rate concurrent with executing the second application, where refreshing the screen according to the second refresh rate is based on not detecting any switch to the first application for at least a threshold amount of time. The operations of 635 may be performed according to the methods described herein. In some examples, aspects of the operations of 635 may be performed by a screen refresh manager as described with reference to FIG. 4.

Figure 7:
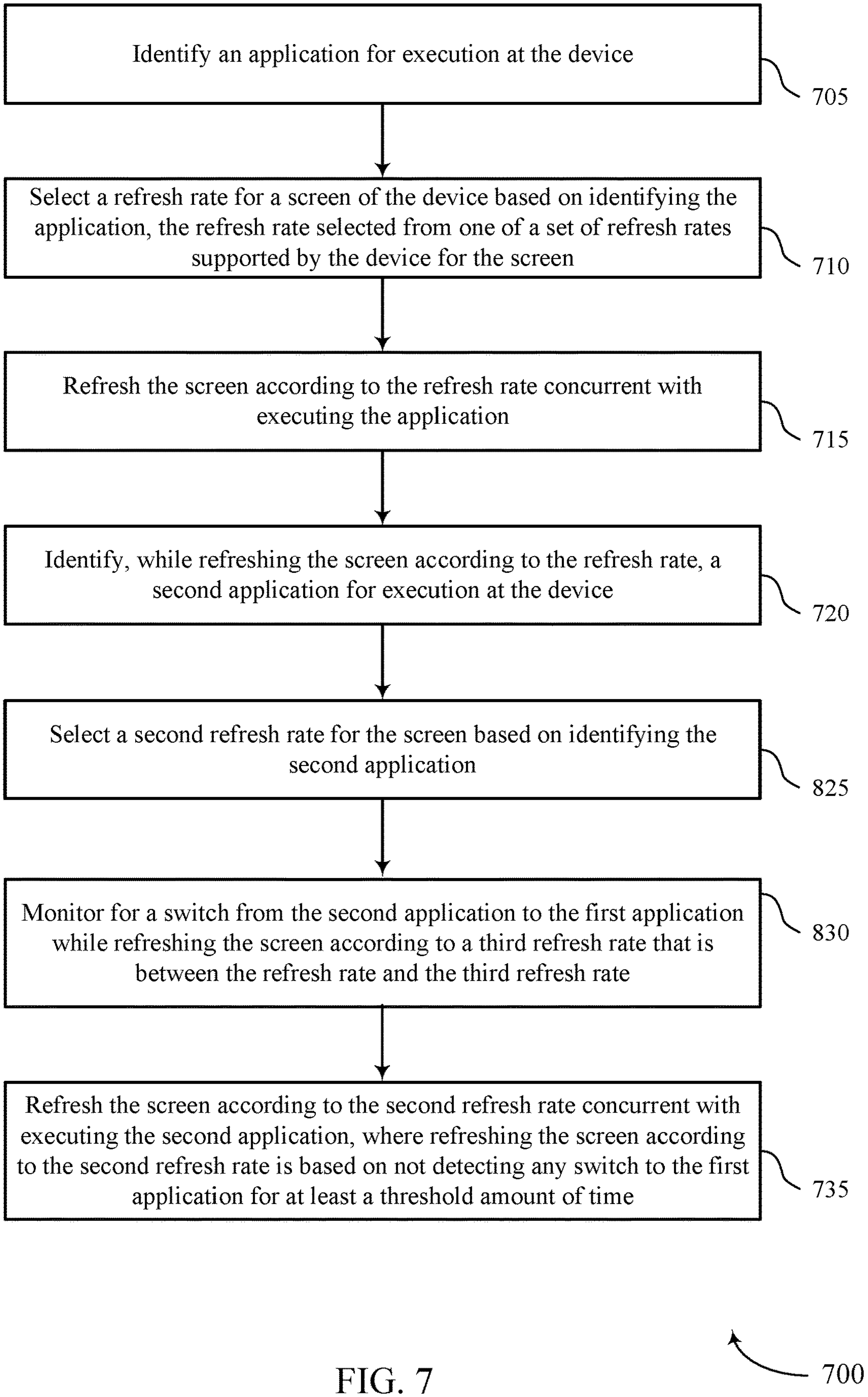

FIG. 7 shows a flowchart illustrating a method or methods 700 that supports a dynamic screen refresh rate in accordance with aspects of the present disclosure. The operations of method 700 may be implemented by an electronic device or its components as described herein. For example, the operations of method 700 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 705, the electronic device may refresh a screen of the device according to a first refresh rate while executing a first application at the device. The operations of 705 may be performed according to the methods described herein. In some examples, aspects of the operations of 705 may be performed by a screen refresh manager as described with reference to FIG. 4.

At 710, the electronic device may detect, while executing the first application at a device, a switch to a second application. The operations of 710 may be performed according to the methods described herein. In some examples, aspects of the operations of 710 may be performed by an application identifier as described with reference to FIG. 4.

At 715, the electronic device may identify, based on detecting the switch, a second refresh rate associated with the second application. The operations of 715 may be performed according to the methods described herein. In some examples, aspects of the operations of 715 may be performed by a refresh rate selection component as described with reference to FIG. 4.

At 720, the electronic device may refresh the screen according to the second refresh rate while executing the second application at the device. The operations of 720 may be performed according to the methods described herein. In some examples, aspects of the operations of 720 may be performed by a screen refresh manager as described with reference to FIG. 4.

In some examples, an apparatus as described herein may perform a method or methods, such as the method 700. The apparatus may include features, means, or instructions (e.g., a non-transitory computer-readable medium storing code including instructions executable by a processor of an electronic device) for refreshing a screen of the device according to a first refresh rate while executing a first application at the device, detecting, while executing the first application at a device, a switch to a second application, identifying, based on detecting the switch, a second refresh rate associated with the second application, and refreshing the screen according to the second refresh rate while executing the second application at the device.

Some examples of the method 700 and the apparatus described herein may further include operations, features, means, or instructions for identifying an amount of charge for a battery of the device, where refreshing the screen according to the second refresh rate may be based on the amount of charge satisfying a threshold.

Some cases of the method 700 and the apparatus described herein may further include operations, features, means, or instructions for identifying a trigger for a third refresh rate while executing the second application, and refreshing the screen according the third refresh rate while continuing to execute the second application.

In some instances of the method 700 and the apparatus described herein, the trigger includes an indication included in the application, a rate of commands received by the device, sensor data associated with the device, or a data transfer rate associated with the device.

Figure 8:
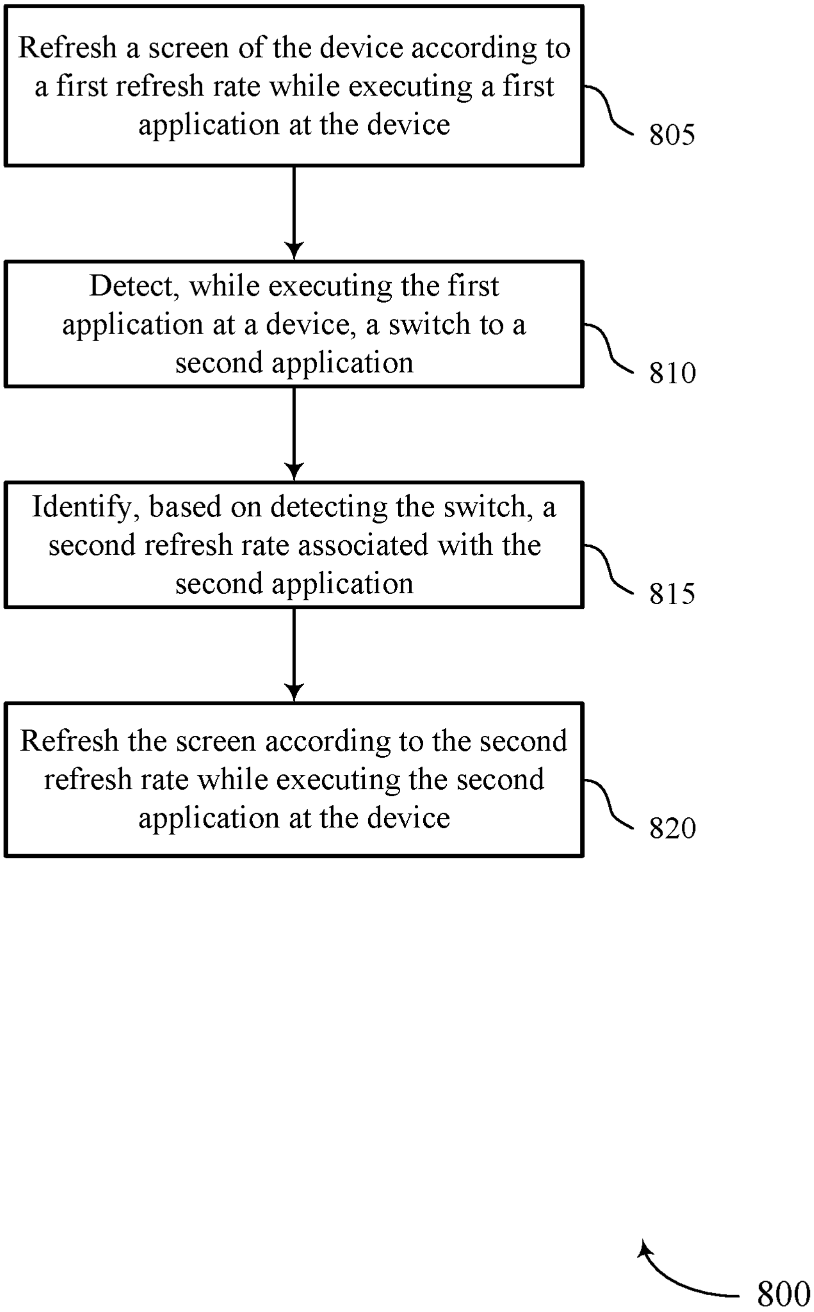
Figure 9:
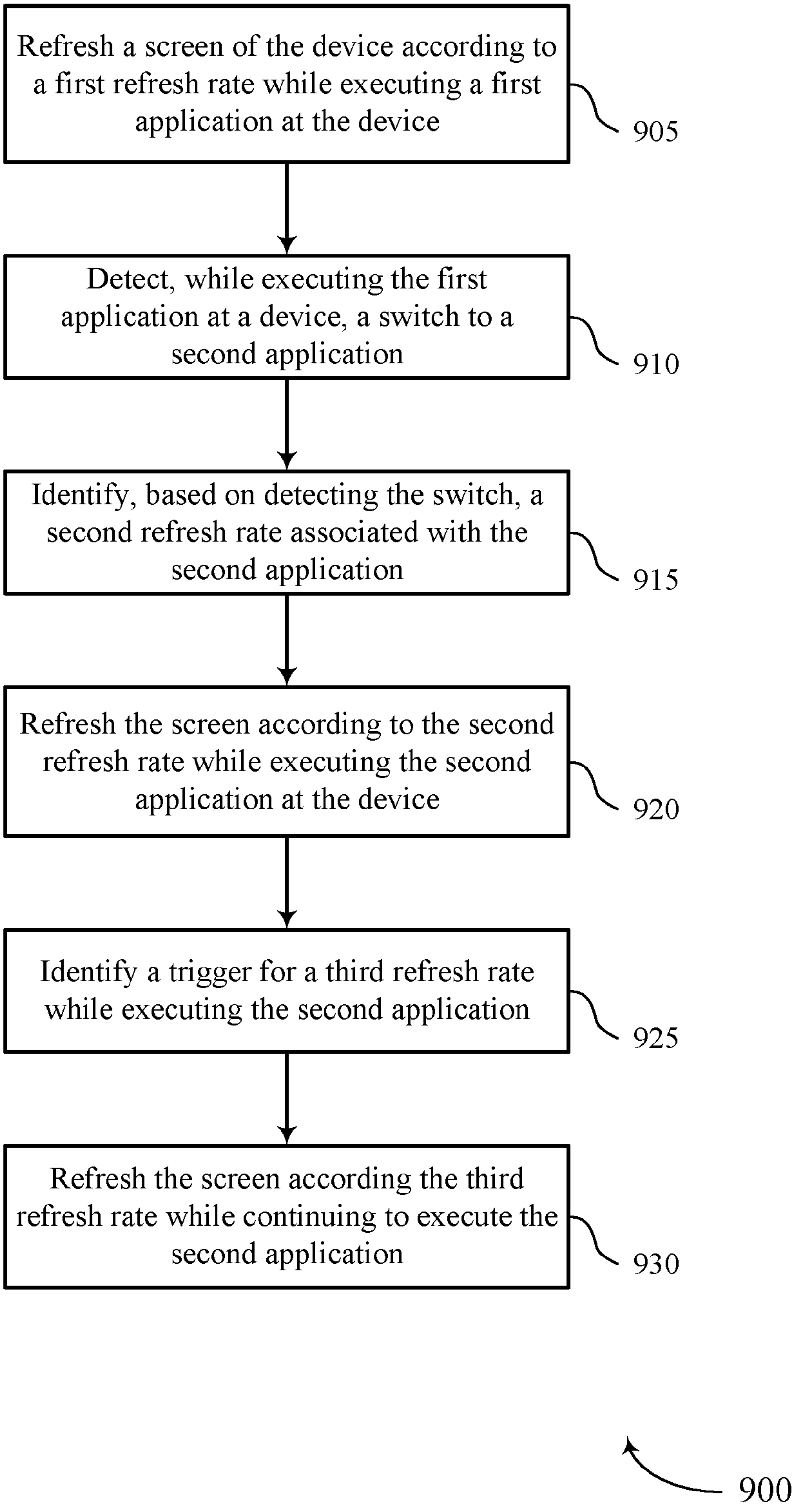

FIG. 8 shows a flowchart illustrating a method or methods 800 that supports a dynamic screen refresh rate in accordance with aspects of the present disclosure. The operations of method 800 may be implemented by an electronic device or its components as described herein. For example, the operations of method 800 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 805, the electronic device may refresh a screen of the device according to a first refresh rate while executing a first application at the device. The operations of 805 may be performed according to the methods described herein. In some examples, aspects of the operations of 805 may be performed by a screen refresh manager as described with reference to FIG. 4.

At 810, the electronic device may detect, while executing the first application at a device, a switch to a second application. The operations of 810 may be performed according to the methods described herein. In some examples, aspects of the operations of 810 may be performed by an application identifier as described with reference to FIG. 4.

At 815, the electronic device may identify, based on detecting the switch, a second refresh rate associated with the second application. The operations of 815 may be performed according to the methods described herein. In some examples, aspects of the operations of 815 may be performed by a refresh rate selection component as described with reference to FIG. 4.

At 820, the electronic device may refresh the screen according to the second refresh rate while executing the second application at the device. The operations of 820 may be performed according to the methods described herein. In some examples, aspects of the operations of 820 may be performed by a screen refresh manager as described with reference to FIG. 4.

At 825, the electronic device may identify a trigger for a third refresh rate while executing the second application. The operations of 825 may be performed according to the methods described herein. In some examples, aspects of the operations of 825 may be performed by an input manager as described with reference to FIG. 4.

At 830, the electronic device may refresh the screen according the third refresh rate while continuing to execute the second application. The operations of 830 may be performed according to the methods described herein. In some examples, aspects of the operations of 830 may be performed by a screen refresh manager as described with reference to FIG. 4.

Figure 10:
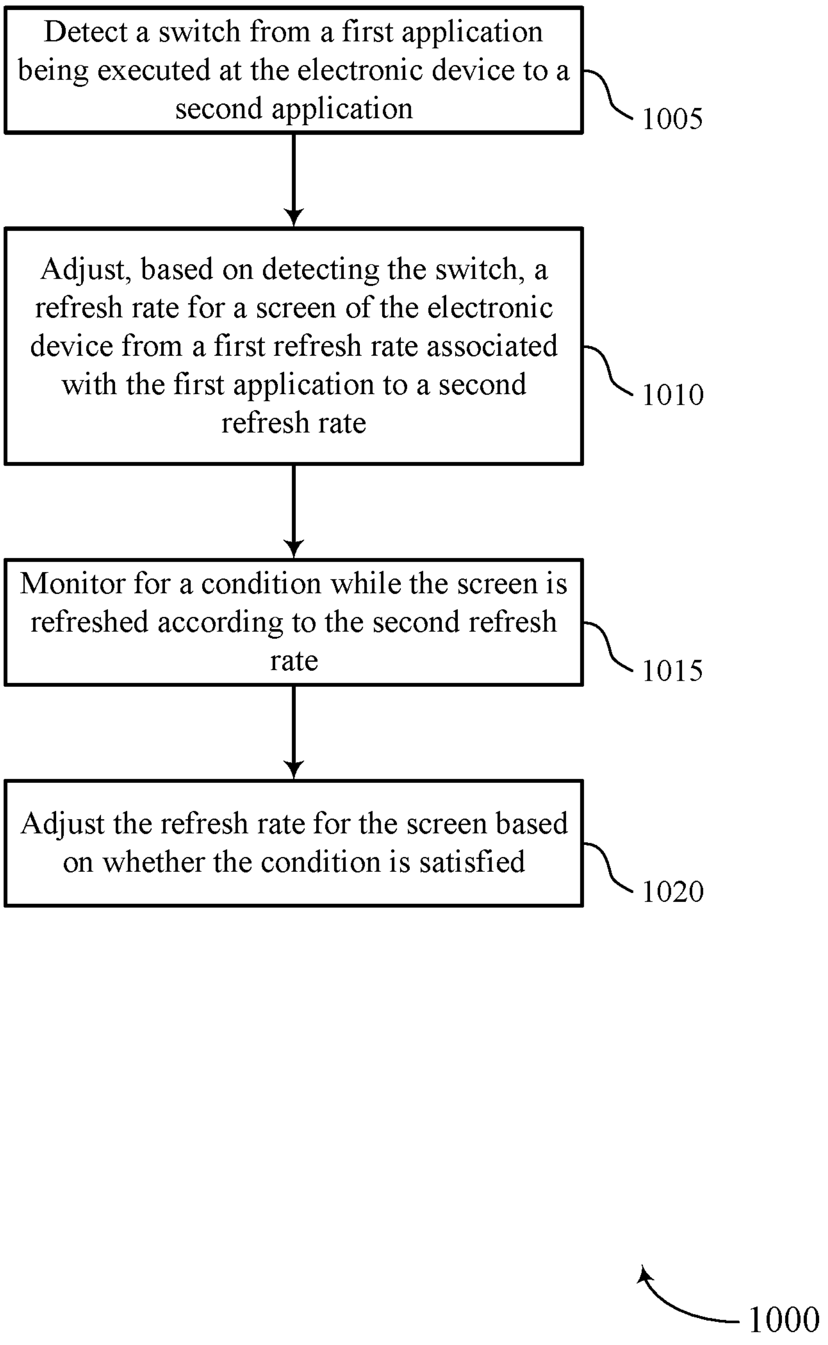

FIG. 10 shows a flowchart illustrating a method or methods 1000 that supports a dynamic screen refresh rate in accordance with aspects of the present disclosure. The operations of method 1000 may be implemented by an electronic device or its components as described herein. For example, the operations of method 1000 may be performed by an electronic device as described with reference to FIG. 4. In some examples, an electronic device may execute a set of instructions to control the functional elements of the electronic device to perform the described functions. Additionally or alternatively, an electronic device may perform aspects of the described functions using special-purpose hardware.

At 1005, the electronic device may detect a switch from a first application being executed at the electronic device to a second application. The operations of 1005 may be performed according to the methods described herein. In some examples, aspects of the operations of 1005 may be performed by an application identifier as described with reference to FIG. 10.

At 1010, the electronic device may adjust, based on detecting the switch, a refresh rate for a screen of the electronic device from a first refresh rate associated with the first application to a second refresh rate. The operations of 1010 may be performed according to the methods described herein. In some examples, aspects of the operations of 1010 may be performed by a refresh rate selection component as described with reference to FIG. 10.

At 1015, the electronic device may monitor for a condition while the screen is refreshed according to the second refresh rate. The operations of 1015 may be performed according to the methods described herein. In some examples, aspects of the operations of 1015 may be performed by a refresh rate selection component as described with reference to FIG. 10.

At 1020, the electronic device may adjust the refresh rate for the screen based on whether the condition is satisfied (e.g., in response to determining whether the condition is satisfied). The operations of 1020 may be performed according to the methods described herein. In some examples, aspects of the operations of 1020 may be performed by a refresh rate selection component as described with reference to FIG. 10.

In some examples, an apparatus as described herein may perform a method or methods, such as the method 1000. The apparatus may include features, means, or instructions (e.g., a non-transitory computer-readable medium storing code including instructions executable by a processor of an electronic device) for detecting a switch from a first application being executed at the electronic device to a second application, adjusting, based on detecting the switch, a refresh rate for a screen of the electronic device from a first refresh rate associated with the first application to a second refresh rate, monitoring for a condition while the screen is refreshed according to the second refresh rate, and adjusting the refresh rate for the screen based on whether the condition is satisfied (e.g., in response to determining whether the condition is satisfied).

Some cases of the method 1000 and the apparatus described herein may further include operations, features, means, or instructions for adjusting the refresh rate for the screen from the second refresh rate to a third refresh rate based on the condition being satisfied.

In some instances of the method 1000 and the apparatus described herein, the second refresh rate may be between the first refresh rate and the third refresh rate.

In some examples of the method 1000 and the apparatus described herein, the third refresh rate may be associated with the second application.

Some cases of the method 1000 and the apparatus described herein may further include operations, features, means, or instructions for adjusting the refresh rate for the screen from the second refresh rate to the first refresh rate based on the condition being unsatisfied. For example, the method 1000 and the apparatus described herein may further include operations, features, means, or instructions for adjusting the refresh rate for the screen from the second refresh rate to the first refresh rate in response to determining that the condition is not satisfied.

Some instances of the method 1000 and the apparatus described herein may further include operations, features, means, or instructions for ceasing to monitor for the condition based on a duration of the monitoring reaching a threshold amount of time.

In some examples of the method 1000 and the apparatus described herein, the condition includes the second application being executed at the electronic device for at least a threshold amount of time after the switch.

In some cases of the method 1000 and the apparatus described herein, the condition includes the second application being continuously executed at the electronic device for at least a threshold amount of time after the switch.

In some instances of the method 1000 and the apparatus described herein, the condition includes the screen being refreshed according to the second refresh rate for at least a threshold amount of time after the switch.

Some examples of the method 1000 and the apparatus described herein may further include operations, features, means, or instructions for determining the second refresh rate based on the first refresh rate and a third refresh rate associated with the second application.

Some cases of the method 1000 and the apparatus described herein may further include operations, features, means, or instructions for identifying the third refresh rate based on an evaluation of the source code for the second application.

Some instances of the method 1000 and the apparatus described herein may further include operations, features, means, or instructions for accessing a lookup table based on detecting the switch, and identifying the third refresh rate based on an entry in the lookup table for the second application.

Some examples of the method 1000 and the apparatus described herein may further include operations, features, means, or instructions for determining a likelihood of a second switch from the second application to the first application, where the condition includes the likelihood being below a threshold for a duration of the monitoring.

Some cases of the method 1000 and the apparatus described herein may further include operations, features, means, or instructions for determining the likelihood of the second switch based on a rate of user inputs to the device, rate of data transfer over a bus within the electronic device, a portion of the first application being executed prior to the switch from the first application to the second application, data associated with another application hosted by the electronic device, or any combination thereof.

In some instances of the method 1000 and the apparatus described herein, the electronic device includes a mobile device.

It should be noted that the methods described herein are possible implementations, and that the operations and the steps may be rearranged or otherwise modified and that other implementations are possible. Further, portions from two or more of the methods may be combined.

An apparatus is described. The apparatus may include an application component operable to execute applications, a screen coupled with the application component and operable to display images associated with the applications, a refresh component coupled with the screen and operable to refresh the screen according to a configurable refresh rate, and a refresh rate component coupled with the refresh component and operable to configure the refresh rate to be different for a second application than for a first application.

In some examples, the refresh rate component may be further operable to configure the refresh rate to be different for a first portion of the first application than for a second portion of the first application.

Some cases of the apparatus may include a battery, where the refresh rate component may be further operable to configure the refresh rate based on a state of the battery.

In some instances, the refresh rate component may be further operable to adjust the refresh rate based on an indication received from the application component.

Some examples of the apparatus may include an input component coupled with the refresh rate component and operable to receive user inputs, where the refresh rate component may be further operable to configure the refresh rate based on a rate of user inputs.

Another apparatus is described. The apparatus may include an application component operable to execute applications, a screen coupled with the application component and operable to display images associated with the applications, a refresh component coupled with the screen and operable to refresh the screen according to a configurable refresh rate, and a refresh rate component coupled with the refresh component.

The refresh rate component may be operable to configure the refresh rate to be a first refresh rate based at least in part on a first application being executed, configure the refresh rate to be a second refresh rate based at least in part on a second application being executed, and configure the refresh rate to be an intermediate refresh rate for at least a duration after a switch from the first application being executed to the second application being executed, the intermediate refresh rate between the first refresh rate and the second refresh rate.

In some examples, the refresh rate component may be further operable to monitor for a condition during the duration after the switch, and adjust the refresh rate from the intermediate refresh rate to the second refresh rate based at least in part on the condition being satisfied.

In some examples, the refresh rate component may be further operable to adjust the refresh rate from the intermediate refresh rate to the first refresh rate based at least in part on the condition being unsatisfied. For example, the refresh rate component may be further operable to adjust the refresh rate for the screen from the second refresh rate to the first refresh rate in response to determining that the condition is not satisfied.

In some examples, the condition may include the second application being executed continuously during the duration after the switch.

In some examples, the condition may include a likelihood of a second switch from the second application to the first application being below a threshold.

In some examples, the refresh rate component may be further operable to determine the intermediate refresh rate based at least in part on an average of the first refresh rate and the second refresh rate.

Another apparatus is described. The apparatus may include a processor, memory coupled with the processor, and a screen coupled with the processor. The apparatus may further include instructions stored in the memory and executable by the processor to cause the apparatus to detect a switch from a first application being executed to a second application, adjust, based at least in part on detecting the switch, a refresh rate for the screen from a first refresh rate associated with the first application to a second refresh rate, monitor for a condition while the screen is refreshed according to the second refresh rate, and adjust the refresh rate for the screen based at least in part on whether the condition is satisfied (e.g., in response to determining whether the condition is satisfied).

In some examples, the instructions may be further executable by the processor to cause the apparatus to adjust the refresh rate for the screen from the second refresh rate to a third refresh rate associated with the second application based at least in part on the condition being satisfied.

In some examples, the second refresh rate may be between the first refresh rate and the third refresh rate.

In some examples, the instructions may be further executable by the processor to cause the apparatus to adjust the refresh rate for the screen from the second refresh rate to the first refresh rate based at least in part on the condition being unsatisfied. For example, the instructions may be further executable by the processor to cause the apparatus to adjust the refresh rate for the screen from the second refresh rate to the first refresh rate in response to determining that the condition is not satisfied.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A non-transitory computer-readable medium storing code comprising instructions, which when executed by a processor of an electronic device, cause the electronic device to:

refresh a screen of the electronic device according to a first refresh rate while executing an application, wherein a refresh rate of the screen is adjustable;

identify, concurrent with executing the application at the electronic device and refreshing the screen at the first refresh rate, a rate of user inputs associated with the application;

compare the rate of user inputs with a threshold rate of user inputs;

estimate, based at least in part on the rate of user inputs, a likelihood of a user of the electronic device switching from the application to a second application within a time period;

compare the likelihood of the user switching to the second application within the time period to a second threshold; and adjust the refresh rate of the screen to a second refresh rate based at least in part on the rate of user inputs satisfying the threshold rate of user inputs, wherein the second refresh rate is greater than the first refresh rate based at least in part on the likelihood of the user switching to the second application within the time period being less than the second threshold.

2. The non-transitory computer-readable medium of claim 1, wherein the instructions, when executed by the processor of the electronic device, cause the electronic device to:

identify a periodicity of pressure on the screen of the electronic device over a second time period, wherein the rate of user inputs associated with the application is based at least in part on the periodicity of the pressure on the screen.

3. The non-transitory computer-readable medium of claim 1, wherein the instructions, when executed by the processor of the electronic device, cause the electronic device to:

identify a rate of change of an angle of the electronic device, wherein the rate of user inputs associated with the application is based at least in part on the rate of change of the angle of the electronic device.

4. The non-transitory computer-readable medium of claim 1, wherein the instructions, when executed by the processor of the electronic device, cause the electronic device to:

identify, using a camera of the electronic device, image data associated with the user of the electronic device, wherein the rate of user inputs is based at least in part on the image data.

5. The non-transitory computer-readable medium of claim 1, wherein the second refresh rate is greater than the first refresh rate based at least in part on the rate of user inputs satisfying the threshold rate of user inputs.

6. The non-transitory computer-readable medium of claim 1, wherein the instructions, when executed by the processor of the electronic device, further cause the electronic device to:

compare a battery level of the electronic device with a threshold battery level, wherein the second refresh rate being greater than the first refresh rate is further based at least in part on the battery level of the electronic device being greater than the threshold battery level.

7. The non-transitory computer-readable medium of claim 1, wherein the instructions to refresh the screen of the electronic device according to the first refresh rate, when executed by the processor of the electronic device, cause the electronic device to:

refresh the screen of the electronic device according to the first refresh rate for a second time period before adjusting the refresh rate to the second refresh rate, wherein the second time period is based at least in part on the rate of user inputs.

8. The non-transitory computer-readable medium of claim 1, wherein the second refresh rate is associated with the application.

9. The non-transitory computer-readable medium of claim 1, wherein the electronic device comprises a mobile device.

10. An apparatus, comprising:

an application component operable to execute applications;

a screen coupled with the application component and operable to display images associated with the applications;

a refresh component coupled with the screen and operable to refresh the screen according to a refresh rate that is configurable; and a refresh rate component coupled with the refresh component and operable to:

identify, concurrent with executing an application at the application component and refreshing the screen at a first refresh rate, a rate of user inputs associated with the application;

compare the rate of user inputs with a threshold rate of user inputs;

estimate, based at least in part on the rate of user inputs, a likelihood of a user of the apparatus switching from the application to a second application within a time period;

compare the likelihood of the user switching to the second application within the time period to a second threshold; and configure the refresh rate to be a second refresh rate based at least in part on the rate of user inputs satisfying the threshold rate of user inputs, wherein the second refresh rate is greater than the first refresh rate based at least in part on the likelihood of the user switching to the second application within the time period being less than the second threshold.

11. The apparatus of claim 10, further comprising:

an input component configured to identify a periodicity of pressure on the screen over a second time period, wherein the rate of user inputs associated with the application is based at least in part on the periodicity of the pressure on the screen.

12. The apparatus of claim 10, further comprising:

an input component configured to identify, based at least in part on sensor data, a rate of change of an angle of the screen, wherein the rate of user inputs associated with the application is based at least in part on the rate of change of the angle of the screen.

13. The apparatus of claim 10, further comprising:

a camera configured to capture image data associated with the user of the apparatus, wherein the rate of user inputs is based at least in part on the image data.

14. A non-transitory computer-readable medium storing code comprising instructions, which when executed by a processor of an electronic device, cause the electronic device to:

refresh a screen of the electronic device according to a first refresh rate while executing an application, wherein a refresh rate of the screen is adjustable;

identify, based at least in part on input data from a user of the electronic device and based at least in part on data received from a second application, a time period in which the user has access to a power source for the electronic device, wherein the data received from the second application indicates a likelihood that the electronic device is to be charged using the power source during the time period;

identify, concurrent with executing the application at the electronic device and refreshing the screen at the first refresh rate, a trigger associated with adjusting the refresh rate of the screen, wherein the trigger is based at least in part on the time period satisfying a threshold time period; and adjust the refresh rate of the screen to a second refresh rate based at least in part on the trigger.

15. The non-transitory computer-readable medium of claim 14, wherein the instructions, when executed by the processor of the electronic device, cause the electronic device to:

identify a location of the electronic device, wherein the trigger is based at least in part on the location of the electronic device.

16. The non-transitory computer-readable medium of claim 14, wherein the instructions, when executed by the processor of the electronic device, cause the electronic device to:

identify a change in a battery level of the electronic device, wherein the trigger is based at least in part on the battery level satisfying a threshold battery level.

17. The non-transitory computer-readable medium of claim 14, wherein the instructions, when executed by the processor of the electronic device, cause the electronic device to:

monitor for a change from the application to the second application, wherein a second trigger associated with adjusting the refresh rate of the screen is based at least in part on an absence of the change to the second application within a second threshold time period.

18. The non-transitory computer-readable medium of claim 14, wherein the data comprises an event indicated by a calendar application, a location indicated by a location application, or both.

* * * * *